(12) United States Patent
Mellits et al.

(10) Patent No.: US 12,709,499 B2
(45) Date of Patent: Aug. 18, 2026

(54) DOCK LEVELER WITH LEG BRACKET ASSEMBLY

(71) Applicant: Overhead Door Corporation, Lewisville, TX (US)

(72) Inventors: Kirk E. Mellits, Fort Worth, TX (US); Vincent M. Maggio, Lewistown, PA (US); Girish Malligere, Frisco, TX (US); Ruiping Ouyang, Richardson, TX (US); Philip Sotak, Lewisville, TX (US)

(73) Assignee: Overhead Door Corporation, Lewisville, TX (US)

( * ) Notice: Subject to any disclaimer, the term of this patent is extended or adjusted under 35 U.S.C. 154(b) by 612 days.

(21) Appl. No.: 18/332,564

(22) Filed: Jun. 9, 2023

(65) Prior Publication Data

US 2023/0365358 A1 Nov. 16, 2023

Related U.S. Application Data

(63) Continuation-in-part of application No. 17/742,779, filed on May 12, 2022.

(51) Int. Cl.
*B65G 69/28* (2006.01)

(52) U.S. Cl.
CPC ................................ *B65G 69/2811* (2013.01)

(58) Field of Classification Search
CPC ............ B65G 69/2841; B65G 69/2876; B65G 69/2894; B65G 69/2811
See application file for complete search history.

(56) References Cited

U.S. PATENT DOCUMENTS

| | | |
|---|---|---|
| 2,644,971 A | 7/1953 | Rowe |
| 3,071,790 A | 1/1963 | Le Clear |
| 3,137,017 A | 6/1964 | Pfleger |
| 3,235,896 A | 2/1966 | Riggs |
| 3,316,575 A | 5/1967 | Larsen |
| 3,323,158 A | 6/1967 | Loomis |
| 3,334,368 A | 8/1967 | Mcintosh |
| 3,368,229 A | 2/1968 | Pfleger |
| 3,411,168 A | 11/1968 | Hecker, Jr. |
| 3,460,175 A | 8/1969 | Beckwith |
| 3,475,778 A | 11/1969 | Merrick |
| 3,486,181 A | 12/1969 | Hecker, Jr. |
| 3,493,984 A | 2/1970 | Reinhard |
| 3,500,486 A | 3/1970 | Le Clear |

(Continued)

OTHER PUBLICATIONS

US 9,376,274 B1, 06/2016, Stone (withdrawn)

*Primary Examiner* — Abigail A Risic
(74) *Attorney, Agent, or Firm* — Haynes and Boone LLP

(57) ABSTRACT

A dock leveler that fits within a loading dock. In some embodiments, the dock leveler may include a leg bracket assembly couplable to a back wall of the dock and a deck. The leg bracket assembly may include a deck hinge shaft. The deck may include a deck platform having a back end and a front end and a beam coupled to a bottom surface of the deck platform. The deck may include a C-shaped profile, a first end coupled to the bottom surface of the deck platform proximate to the back end, and a second end coupled to the bottom surface of the deck platform proximate to the front end. The first end of the beam may include an extension having a cutout shaped to fit around the deck hinge shaft

20 Claims, 16 Drawing Sheets

(56) References Cited

U.S. PATENT DOCUMENTS 3,516,103 A 6/1970 Hecker, Jr.
3,570,033 A 3/1971 Hovestad
3,583,014 A 6/1971 Brown
3,587,126 A 6/1971 Potter
3,636,578 A 1/1972 Dieter
3,646,627 A 3/1972 Potter
3,665,538 A 5/1972 Smith
3,685,077 A * 8/1972 Wiener .............. B65G 69/2811 14/71.3
3,766,585 A 10/1973 Yoon
3,786,530 A 1/1974 Leclear
3,835,497 A 9/1974 Smith
3,839,761 A 10/1974 Stevenson
3,840,930 A * 10/1974 Wanddell ............. B65G 69/001 14/71.3
3,858,264 A 1/1975 Kuhns
3,882,563 A 5/1975 Smith
3,883,917 A 5/1975 Alten
3,921,241 A 11/1975 Smith
3,967,337 A 7/1976 Artzberger
3,974,537 A 8/1976 Ellis
3,982,295 A 9/1976 Burnham
3,997,932 A 12/1976 Artzberger
4,014,059 A 3/1977 Artzberger
4,065,824 A 1/1978 Ellis
4,068,338 A 1/1978 Artzberger
4,081,874 A 4/1978 Artzberger
4,091,488 A 5/1978 Artzberger
4,097,949 A 7/1978 Barrett
4,110,860 A 9/1978 Neff
4,126,909 A 11/1978 Smith
RE30,104 E 10/1979 Burnham
4,257,137 A 3/1981 Hipp
4,398,315 A 8/1983 Driear
4,402,100 A 9/1983 Slusar
4,455,703 A 6/1984 Fromme
4,525,887 A 7/1985 Erlandsson
4,531,248 A 7/1985 Swessel
4,570,277 A 2/1986 Hahn
4,665,579 A 5/1987 Bennett
4,689,846 A 9/1987 Sherrod
4,703,534 A 11/1987 Pedersen
4,776,052 A 10/1988 Delgado
4,847,935 A 7/1989 Alexander
4,865,507 A 9/1989 Trickle
4,935,979 A 6/1990 Walker
4,937,906 A 7/1990 Alexander
4,974,276 A 12/1990 Alexander
4,995,130 A 2/1991 Hahn
5,040,258 A 8/1991 Hahn
5,117,526 A 6/1992 Alexander
5,123,135 A 6/1992 Cook
5,195,205 A 3/1993 Cook
5,214,818 A 6/1993 Cook
5,274,867 A 1/1994 Hageman
5,303,443 A 4/1994 Alexander
5,311,628 A 5/1994 Springer
5,317,775 A 6/1994 Das Dores
5,323,503 A 6/1994 Springer
5,343,583 A 9/1994 Cook
5,440,772 A 8/1995 Springer
5,450,643 A 9/1995 Warner
5,551,113 A 9/1996 Marler
5,560,063 A 10/1996 Alten
5,586,355 A 12/1996 Metz
5,621,938 A 4/1997 Warner
5,644,812 A 7/1997 Neufeldt
5,657,502 A 8/1997 Ellis
5,784,740 A 7/1998 Disieno
6,061,859 A 5/2000 Winter
6,085,375 A 7/2000 Holm
6,098,227 A 8/2000 Meichtry
6,112,353 A 9/2000 Winter
6,125,491 A 10/2000 Alexander
6,163,913 A 12/2000 Disieno
6,205,606 B1 3/2001 Zibella
6,240,587 B1 6/2001 Meichtry
6,327,733 B1 12/2001 Alexander
6,368,043 B1 4/2002 Leum
6,405,397 B1 6/2002 Alexander
6,442,783 B1 9/2002 Yoon
6,473,926 B2 11/2002 Lounsbury
6,481,038 B2 11/2002 Lounsbury
6,487,741 B2 12/2002 Alexander
6,629,328 B2 10/2003 Widule
6,711,774 B2 3/2004 Hodges
6,760,944 B2 7/2004 Hodges
6,769,149 B2 8/2004 Alexander
6,820,295 B2 11/2004 Webster
6,834,409 B2 12/2004 Gleason
6,892,411 B1 5/2005 Yoon
6,910,239 B2 6/2005 Hodges
6,931,686 B2 8/2005 Hoofard
6,951,041 B2 10/2005 Hoofard
6,973,693 B1 12/2005 Mayer
6,988,289 B2 1/2006 Pedersen
7,013,519 B2 3/2006 Gleason
7,017,220 B2 3/2006 Alexander
7,032,267 B2 4/2006 Mitchell
7,043,790 B2 5/2006 Alexander
7,047,584 B2 5/2006 Hoofard
7,062,813 B2 6/2006 Hoofard
7,100,233 B2 9/2006 Alexander
7,131,160 B2 11/2006 Alexander
7,134,159 B2 11/2006 Muhl
7,162,761 B2 1/2007 Alexander
7,213,285 B2 5/2007 Mitchell
7,213,286 B2 5/2007 Hoofard
7,216,392 B2 5/2007 Hoofard
7,225,493 B2 6/2007 Hoofard
7,353,558 B2 4/2008 Alexander
7,363,670 B2 4/2008 Mitchell
7,409,739 B2 8/2008 Whitley
D579,754 S 11/2008 Gleason
7,546,655 B2 6/2009 Mitchell
7,657,957 B2 2/2010 Alexander
7,865,992 B1 1/2011 Ion
7,926,140 B2 4/2011 Whitley
7,996,943 B2 * 8/2011 Wallis .................. B65G 69/287 14/71.3
8,132,280 B2 3/2012 Gleason
8,141,189 B2 3/2012 Mitchell
8,327,486 B2 12/2012 Fontaine
8,407,842 B2 4/2013 Story
8,544,130 B2 10/2013 Sveum
8,627,529 B1 1/2014 Palmersheim
9,150,368 B2 10/2015 Hodges
9,284,135 B2 3/2016 Sveum
9,546,056 B2 1/2017 Stone
9,938,094 B1 4/2018 Leum
9,944,475 B1 4/2018 Leum
10,040,646 B2 8/2018 Yule
10,597,242 B1 3/2020 Sivakumar
10,612,200 B2 * 4/2020 Bock, II .................. E01F 13/12
11,273,999 B1 3/2022 Leum
11,511,954 B2 11/2022 Leum
2005/0011020 A1 1/2005 Alexander
2005/0132512 A1 6/2005 Muhl et al.
2005/0160540 A1 7/2005 Hoofard
2005/0251934 A1 11/2005 Yoon
2005/0273949 A1 12/2005 Gleason
2006/0042030 A1 3/2006 Yoon
2006/0045678 A1 3/2006 Andersen
2006/0156493 A1 7/2006 Alexander
2007/0017043 A1 1/2007 Alexander
2007/0017044 A1 1/2007 Alexander
2007/0226923 A1 10/2007 Alexander
2015/0013083 A1 1/2015 Palmersheim
2017/0073176 A1 3/2017 Yule
2017/0137239 A1 * 5/2017 Kimener ................ B60D 1/665
2022/0332528 A1 10/2022 Shahbazian
2024/0409332 A1 * 12/2024 Sotak ................ B65G 69/2811

* cited by examiner

DOCK LEVELER WITH LEG BRACKET ASSEMBLY

CROSS REFERENCE TO RELATED APPLICATIONS

This application is a continuation-in-part application of U.S. application Ser. No. 17/742,779, filed May 12, 2022, entitled "Dock Leveler," which is hereby incorporated by reference, in its entirety.

TECHNICAL FIELD

The present disclosure relates generally to dock levelers for bridging the gap between a loading dock and a bed of a truck, trailer, or other transport.

BACKGROUND

Loading dock levelers, such as mechanical dock levelers, hydraulic dock levelers, air dock levelers, and vertical dock levers, are used to bridge the gap and height difference between a loading dock and a trailer, truck bed, or other transport. The loading dock levelers also compensate for up and down float of the transport during loading and unloading. Typically, dock levelers are installed in a pit that is formed in the loading dock allowing for upward and downward movement from the dock floor to the transport.

Problems arise in current dock leveler designs. For example, installation of current dock levelers often includes shimming various parts of the dock leveler. In particular, multiple parts of the leg bracket assembly disposed at the back of the pit and the chassis disposed on the floor or bottom surface of the pit requires shimming to level and stabilize the dock leveler. This can be a difficult process that may require significant amounts of time and effort. Additionally, in cases where the pit or dock leveler may be outside of the specifications, current dock leveler systems may not be easily adjustable to accommodate these variations. Moreover, parts of current dock levelers may not have optimal stability or longevity, leading to increased cost and maintenance over the lifetime of the dock leveler.

This disclosure is directed to innovative and new dock leveler designs that may address one or more of these or other shortcomings of conventional dock leveler systems including using fewer parts, improving the efficiency of installation and operation, and increasing the stability of the dock leveler.

SUMMARY

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

Some implementations of the present disclosure may include a dock leveler for a loading dock. The dock leveler may include a bridge assembly including a deck and a lip extendable from the deck, where the lip is pivotally movable between a stowed position and an extended position. The dock leveler may also include a frame supporting the bridge assembly. The dock leveler may also include a beam and a lip keeper. The beam may include a first end positioned proximate a front edge of the dock. The lip keeper assembly may be configured to selectively secure the lip in the stow position. The lip keeper assembly may be adjustably coupled to the beam permitting adjustment relative to the beam toward or away from the front edge of the dock.

Some implementations of the present disclosure may include a dock leveler having an adjustable leg bracket assembly. The dock leveler may include an adjustment bracket and a threaded adjustment shaft. The adjustment bracket may include a horizontal plate having a threaded hole. The threaded adjustment shaft may extend through the threaded hole of the horizontal plate and may be configured to adjust a height of the leg bracket assembly by rotation of the adjustment shaft relative to the horizontal plate. The threaded adjustment shaft may have a leading end that abuts against a base plate disposable in a fixed position on a floor of the dock. The base plate may be independent from the adjustment shaft.

Some implementations of the present disclosure may include a dock leveler for a loading dock. The dock leveler may include a plurality of legs, a horizontally extending lower bracket coupled to a bottom region of each leg of the plurality of legs, a horizontally extending upper bracket coupled to an upper region of each leg of the plurality of legs, and a pivot boss coupled to the lower bracket. The pivot boss may include a first mounting plate coupled to the adjustment bracket and a first hole and a pivot rod for pivotable attachment to at least one of a lower arm and an upper arm of a lift arm assembly.

Some implementations of the present disclosure may include a dock leveler. The dock leveler may include a leg, a deck hinge bracket coupled to a top portion of the leg, a first stock plate coupled to the deck hinge bracket, and a deck hinge shaft coupled to the first stock plate. The first stock plate may extend upward from the deck hinge bracket and may extend along at least a portion of the length of the deck hinge bracket.

Some implementations of the present disclosure may include a dock leveler. The dock leveler may include a leg and a deck hinge bracket coupled to a top portion of the leg. The deck hinge bracket may include a rear plate couplable to a back wall of the dock, a bottom plate coupled to the rear plate, and a deck hinge shaft coupled to the bottom plate of the deck hinge bracket.

Some implementations of the present disclosure may include a dock leveler for a loading dock. The dock leveler may include a leg bracket assembly couplable to a back wall of the dock and a deck. The leg bracket assembly may include a deck hinge shaft. The deck may include a deck platform having a back end and a front end and a beam coupled to a bottom surface of the deck platform. The deck may include a C-shaped profile, a first end coupled to the bottom surface of the deck platform proximate to the back end, and a second end coupled to the bottom surface of the deck platform proximate to the front end. The first end of the beam may include an extension having a cutout shaped to fit around the deck hinge shaft.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
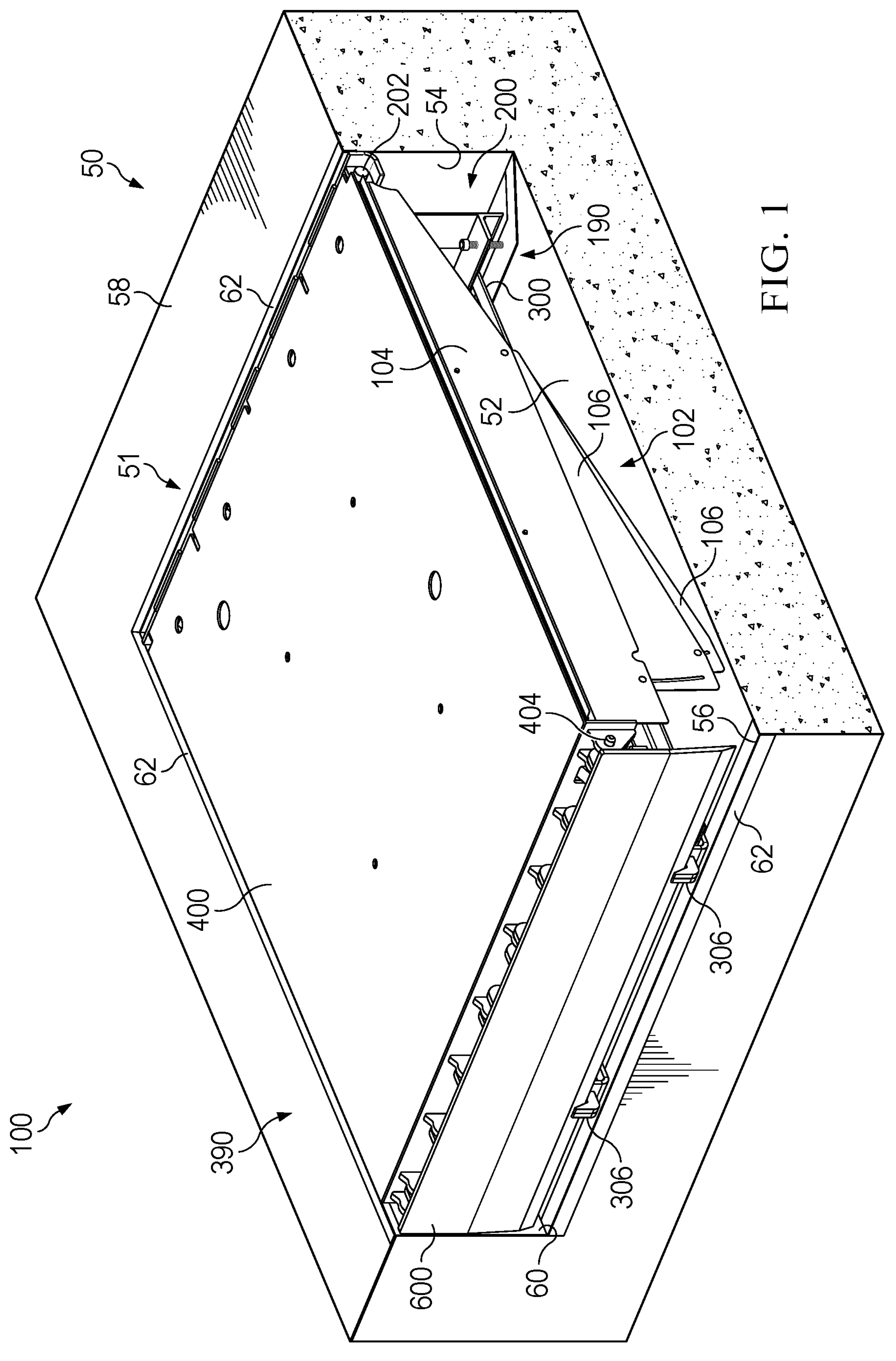
FIG. 1 is a perspective view of a dock leveler in a stowed position, according to some embodiments of the present disclosure.

These Figures will be better understood by reference to the following Detailed Description.

DETAILED DESCRIPTION

For promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

Figure 2:
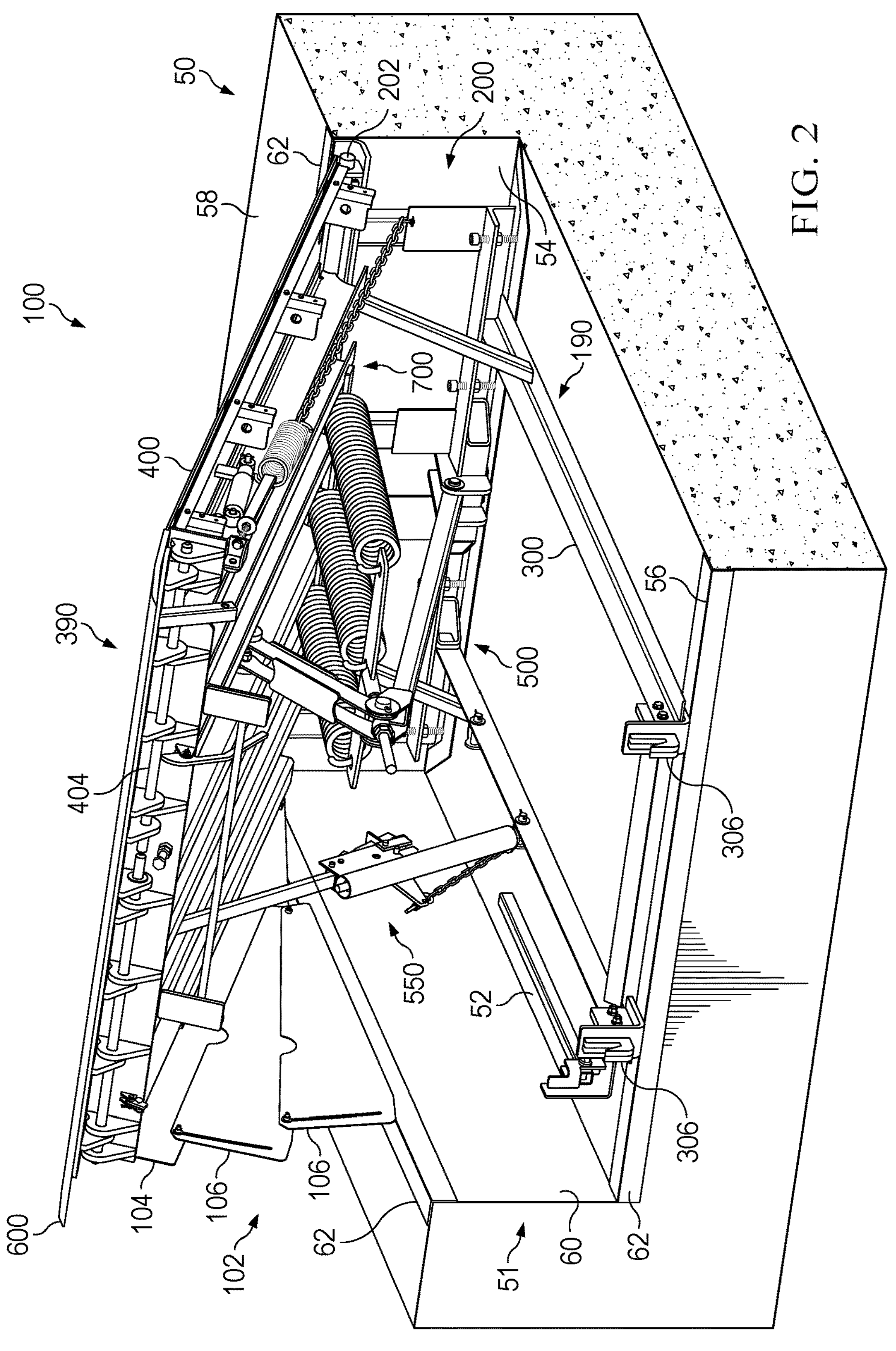
FIG. 2 is a perspective view of a dock leveler in an extended position, according to some embodiments of the present disclosure.
Figure 3:
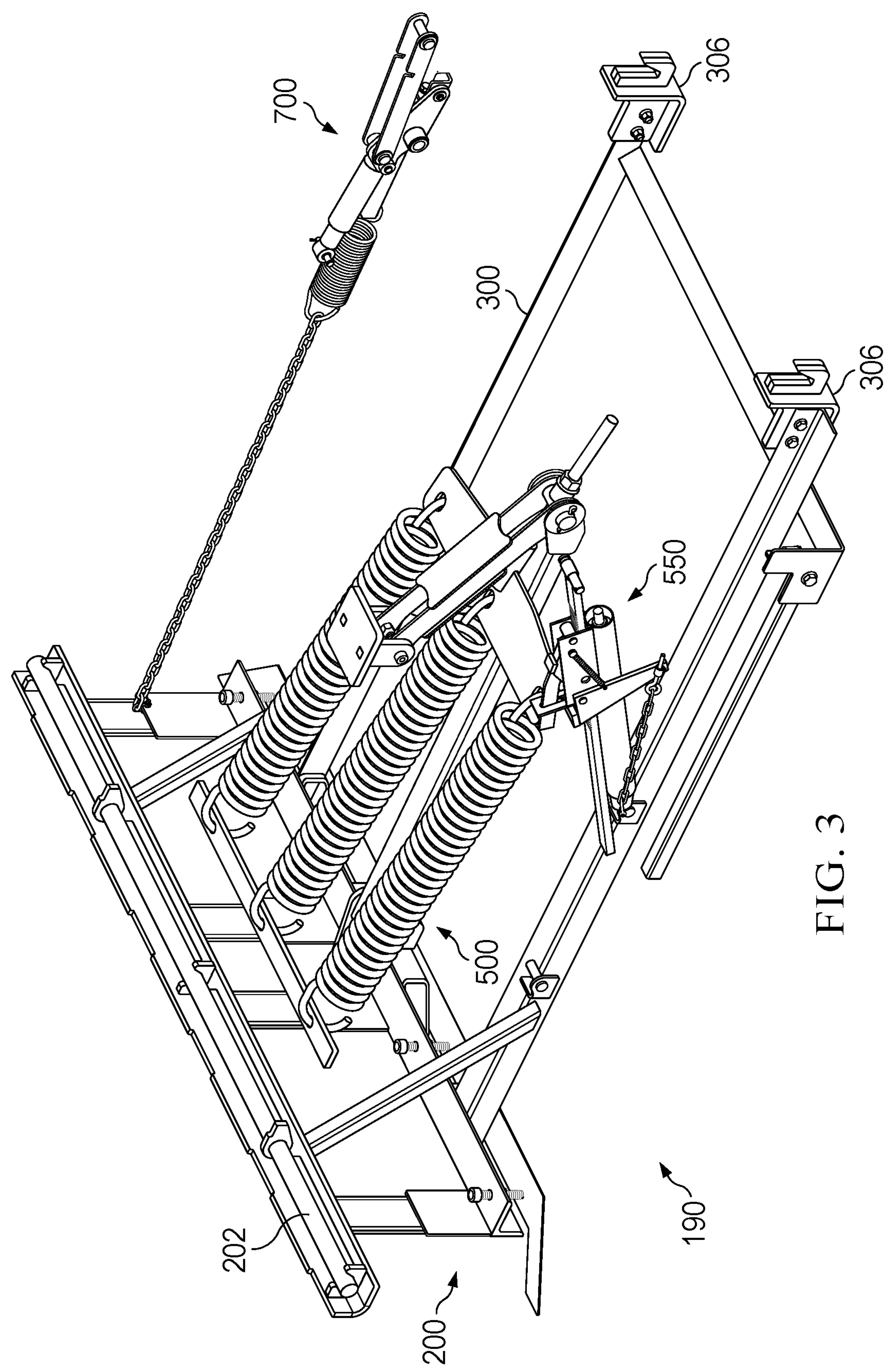
FIG. 3 is a perspective view of the dock leveler without the deck or lip, according to some embodiments of the present disclosure.

FIG. 1 illustrates a loading dock leveler 100 in a stowed position and FIG. 2 illustrates the dock leveler 100 in an extended position, according to some embodiments of the present disclosure. The loading dock leveler 100, also referred to as a dock leveler 100 herein, includes a frame 190 including a leg bracket assembly 200 and a chassis 300. The dock leveler 100 also includes a bridge assembly 390 including a deck 400 and a lip 600. The dock leveler 100 is installed on a loading dock and more specifically within a dock pit formed within the loading dock. In some embodiments, the dock leveler 100 is a pit dock leveler. However, in other embodiments, the dock leveler 100 described may be used in any dock-leveling application, including edge-of-dock, vertical loading, or other levelers or applications. Moreover, the illustrated embodiments may show a mechanical dock leveler; however, the disclosure is not intended to be so limited. Instead, the disclosure includes dock leveler actuated according to any suitable method, including hydraulically-powered, air-powered, or otherwise powered dock levelers.

Typically, the loading dock 50 is constructed of concrete and is large enough to accommodate one or more trailers or trucks side by side. For illustration purposes and ease of discussion, only one dock leveler 100 capable of operating with one trailer or truck is illustrated and described. However, it is understood that the loading dock may include more than one dock pit, each including a dock leveler 100 installed therein. Installation and use of the dock leveler 100 with a loading dock constructed of materials other than concrete are contemplated herein and are not excluded by this description.

A pit 51 is formed in the dock 50 and the dock leveler 100 is sized and shaped to fit within the pit 51. The pit 51 includes a bottom surface 52, a back wall 54, a front edge 56 opposite the back wall 54. Two sides or sidewalls 60 connect the front opening of the pit 51 with the back wall 54. In some embodiments, one or more curb angles 62 may be coupled to the top edge of the back wall 54 and/or sidewalls 60 of the pit 51 and the top surface 58 of the dock 50. There may also be a curb angle 62 disposed on the front edge 56 of the pit 51.

The leg bracket assembly 200 of the dock leveler 100 is disposed at the rear of the pit 51. In some embodiments, some components of the leg bracket assembly may be attached to the rear wall 54 and/or the bottom surface 52 of the pit. The leg bracket assembly 200 includes a deck hinge shaft 202. The deck 400 is pivotably or rotatably coupled to the deck hinge shaft 202 of the leg bracket assembly 200. Thus, the leg bracket assembly 200 may support the deck 400 and allow the deck 400 to rotate between a stowed position, a raised position, an engaged position, and a below-dock position, as described in more detail below.

A lift arm assembly 500 is coupled to the deck 400 on one end and the leg bracket assembly 200 on the other end. The lift arm assembly 500 biases the deck 400 upward, thus moving the deck 400 towards a raised position. The lift arm assembly 500 is described in more detail below.

The frame 190 includes a chassis 300 that may be disposed on the bottom surface 52 of the pit and may provide additional support to the bridge 390, including the deck 400.

The chassis 300 is coupled to the leg bracket assembly 200 and extends from the leg bracket assembly 200 to the front portion of the pit 51. A hold down assembly 550 may be coupled to the chassis 300 on one end and to the deck 400 on the other end. The hold down assembly 550 may hold the deck 400 in an engaged or stowed position, as described in more detail below. Thus, the lift arm assembly 500 and the hold down assembly 550 cooperate to allow an operator to move the deck 400 from a stowed position into a raised position and an engaged position, and back into a stowed position.

A lip hinge shaft 404 may be coupled to a front end of the deck 400. The front shaft 400 may be pivotably or rotatably coupled to the lip 600. The lip 600 may rest on the edge of the truck and such that the bridging assembly 390 creates a bridge between the truck and the top surface 58 of the dock 50 for unloading and/or loading of the truck. The chassis 300 may include one or more lip keepers 306 disposed at or proximate to a front edge 56 of the pit. When in the stowed position, the front end of the lip 600 may rest in the lip keepers 306, as described in more detail below. A lip actuation assembly 700 is coupled to the leg bracket assembly 200, the deck 400, and the lip 600 and may be configured to hold or move the lip 600 into a raised position and/or engaged position. In some embodiments, the momentum of the upward movement of the deck 400 by the lift arm assembly 500 moves the lip 600 from a stowed position into a raised position and the lip actuation assembly 700 holds the lip 600 in a raised position and resist downward movement of the lip 600.

The dock leveler 100 is configured to move, rotate, or pivot between a variety of positions. When not in use, the dock leveler 100 may be in a stowed position. In the stowed position, the deck 400 is horizontal and flush with the top surface of the loading dock. The lip 600 is vertical in the stowed position and, thus, is perpendicular to the deck 400 in the stowed position. The front edge of the lip 600 is disposed in or rests in the lip keepers 306. The hold down assembly 550 is engaged so that it resists the lift arm assembly 500, which pushes the deck 400 upwards. Thus, the hold down assembly 550 holds the dock leveler 100 in a stowed position.

When an operator releases the hold down assembly 550, the lift arm assembly 500 biases the dock leveler 100 into an extended or raised position. When in a raised position, the deck 400 is angled upward from the top surface of the dock 50. As the deck 400 raises, the momentum or force of the upward movement of the deck 400 moves the lip 600 upwards. In some embodiments, the lip 600 may be aligned with the deck 400 in the raised position. In other words, the lip 600 may be at the same angle relative to the top surface 58 of the dock 50 as the deck 400. Thus, there may be a generally straight line from the dock to the front end of the lip 600. However, in some embodiments, the lip 600 may not be aligned with the deck 400 and may instead be angled upwards or downwards relative to the deck 400. The lip actuation assembly 700 resists downward movement of the lip 600 to hold the lip 600 in the raised position.

The operator may then move the dock leveler 100 into an engaged position in which the lip 600 rests on the end of the truck or trailer and the bridging assembly 390 forms a surface that allows people or equipment to move between the dock 50 and the truck. The operator may add weight onto the deck 400 to push the deck 400 downwards from the raised position. For example, the operator may walk from the dock onto the deck 400 to move the deck 400 into an engaged position. As the deck 400 moves downwards, the lip 600 may contact and press on the end of the truck. This may prevent the dock leveler 100 from moving further downwards. The hold down assembly 550 reengages, thus holding the dock leveler 100 in the engaged position. In some embodiments, the end of the truck may be higher than the top surface of the dock 50. In these embodiments, the deck 400 and/or lip 600 may be angled upward with respect to the top surface 58 of the dock 50. In other embodiments, the end of the truck may be the same height or lower than the top surface 58 of the dock 50. In these embodiments, the deck 400 and/or lip 600 may be angled downward with respect to the top surface 58 of the dock 50.

When finished using the dock leveler 100, the operator may move the truck out from under the lip 600. The dock leveler 100 may then move back into the stowed position.

The deck 400 may rotate or pivot through a range of angles relative to the horizontal. For example, the deck 400 may rotate or pivot through a variety of angles between 7 degrees below the horizontal to 20 degrees above the horizontal (inclusively). For example, the deck 400 may be at 0 degrees in the stowed position and 20 degrees above the horizontal in the extended position. The deck 400 may be lowered to an engaged position that is between 0 degrees and 20 degrees above the horizontal or a below-deck position of 0 to 7 degrees below the horizontal.

The dock leveler 100 may include a toe guard assembly 102 coupled to sidewalls of the deck 400. The toe guard assembly 102 may include a first toe guard 104 that may be riveted to the deck 400 to secure the first toe guard 104 to the deck 400. In some embodiments, one or more additional toe guards 106 may be coupled to the first toe guard 104. These additional toe guard(s) 106 may be moveably or slidably coupled to the first toe guard 104. In embodiments where there is a first toe guard 104 coupled to the deck 400 and one or more additional toe guards 106, as the deck 400 is raised, the additional toe guards 106 may slide or move downward relative to the first toe guard 104 to at least partially cover the openings between the sides of the deck 400 and the top edge of the sides 60 of the pit 51. The toe guard assembly 102 acts as shield to protect the feet of workers from slipping under the dock leveler 100 and into the dock pit 51. The toe guard assembly 102 also serves to keep trash out of the dock pit 51.

Figure 4:
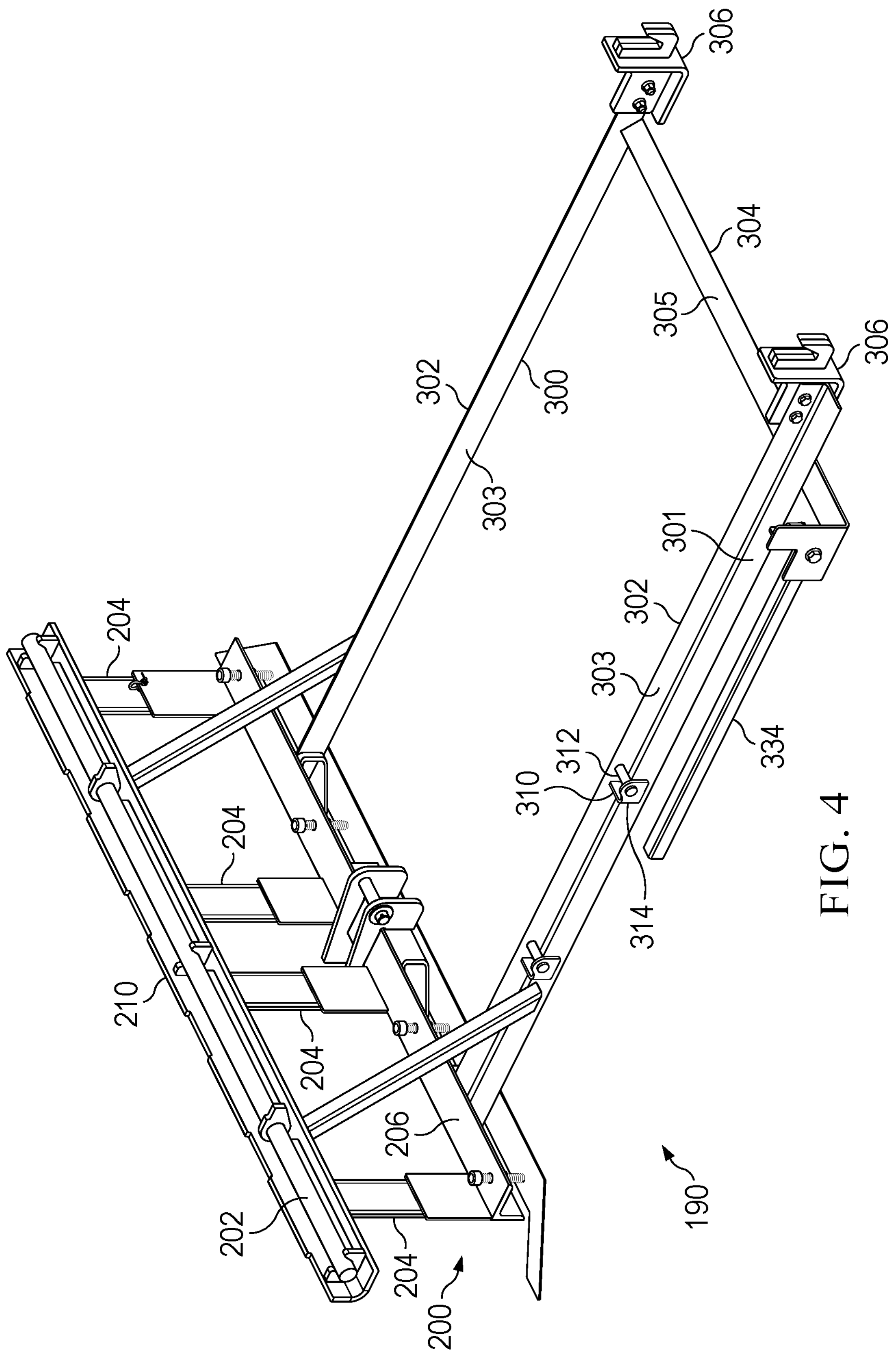
FIG. 4 is a perspective view of the frame with a chassis and a leg bracket assembly of a dock leveler, according to some embodiments of the present disclosure.

FIG. 4 illustrates a perspective view of the frame 190, including the leg bracket assembly 200 and the chassis 300. The leg bracket assembly 200 includes one or more legs 204, an adjustment bracket 206 coupled to the bottom of each leg 204, a base plate 208 coupled to the bottom surface 52 of the pit 51 and disposed below the bottom of the legs 204, and a deck hinge bracket 210 coupled to the top of each leg 204.

The chassis 300 includes one or more longitudinal beams 302. The first end of each longitudinal beam 302 is coupled to the adjustment bracket 206 of the leg bracket assembly 200. The second end of the longitudinal beams 302 extend towards the front edge 56 of the pit 51. In some embodiments, the second end of the beam 302 may be disposed at or proximate to a front edge 56 of the pit 51. In the illustrated embodiment, the chassis 300 includes two longitudinal beams 302. However, in other embodiments, the chassis 300 may include any suitable number of longitudinal beams 302. For example, the chassis 300 may include 1, 3, 4, 5, 6, 7, 8, 9, or 10 longitudinal beams 302. The longitudinal beams 302 include a horizontal plate 301 and a vertical plate 303. The horizontal plate 301 is coupled to the bottom surface 52 of the pit 51 and the vertical plate 303 extends upwardly from the horizontal plate 301. The vertical plate 303 may extend from one side of the horizontal plate 301 or may extend from the horizontal plate 301 between its sides. In other embodiments, the longitudinal beams 302 may be any suitable shape. In some embodiments, the longitudinal beams 302 may be square or rectangular tubes.

One or more lateral beams 304 connect the longitudinal beams 302 and may be arranged generally perpendicular to the longitudinal beams 302. Thus, the longitudinal beams 302 may extend from the back wall 54 of the pit 51 to the front and the lateral beams 304 may extend from one side of the pit 51 to the other. In the illustrated embodiment, the chassis 300 includes one lateral beam 304 that couples the front portion of the longitudinal beams 302 together. A first end of the lateral beam 304 is coupled to one longitudinal beam 302 and the second end is coupled to the other longitudinal beam 302. Thus, the chassis 300 may form a rectangular shape along the bottom surface 52 of the pit 51. The lateral beam 304 includes two angled plates 305 that form a V-shape, with the bottom of the "V" pointed upwards (which may also be described as a tent or hat shape). In other embodiments, the lateral beams 304 may be shaped similar or identical to the longitudinal beams 302 or may have any other suitable shape.

In some embodiments, the chassis 300 may include one or more additional support beams 308. A first end of the support beam 308 is coupled to the deck hinge bracket 210 of the leg bracket assembly 200 and a second end of the support beam 308 may be coupled to a longitudinal beam 302. In some embodiments, the support beams 308 may be angled between the deck hinge bracket 210 and the longitudinal beams 302. In other embodiments, the support beams 308 may be vertical. In some embodiments, the first end of the support beam 308 may be coupled to a leg 204 of the leg bracket assembly 200 or to the back wall of the pit. In some embodiments, the second end of the support beam 308 may be coupled to a lateral beam 304 or the bottom surface 52 of the pit 51. The support beams 308 may provide additional support to the deck hinge bracket 210 and thus may partially support the weight of the deck 400 and distribute part of the weight from the leg bracket assembly 200 to the chassis 300. The support beams 308 may also provide additional stability to the dock leveler 100.

Each of the beams 302, 304 may be welded to the bottom surface 52 of the pit 51. However, the beams 302, 304 may be affixed to the bottom surface 52 in any suitable way, including, for example, by fastening the beams 302, 304 to the bottom surface 52 using bolts or screws. The adjustment bracket 204 and the longitudinal beams 302 may be coupled in any suitable way. For example, in some embodiments, the longitudinal beams 302 may be welded to the adjustment bracket 204 or they may be fastened using, for example, bolts. Similarly, the longitudinal beams 302 and the lateral beams 304 may be coupled in any suitable way. For example, in some embodiments, the lateral beams 304 may be welded to the longitudinal beams 302 or they may be fastened using, for example, bolts.

A dampener mount 310 is coupled to a longitudinal beams 302. The dampener mount 310 includes a rod or bar 312 and a bracket 314. The bracket 314 is coupled to the longitudinal beam 302 such that there is a space between a wall of the bracket 314 and a part of the longitudinal beam 302. The rod 312 extends in this space between the longitudinal beam 302 and the bracket 314. The rod 312 may be fixedly coupled to the bracket 314 and the longitudinal beam 302, but in other embodiments, the rod 312 may be rotatably or pivotably coupled thereto. The rod 312 may be secured to the bracket 314 and the longitudinal beam 302 in any suitable way. For example, the rod 312 may have a head larger than the hole on either the longitudinal beam 302 or the bracket 314. The end opposite the head may include a hole through which a pin can be disposed to couple the rod 312 in place on the dampener mount 310. A ratchet bar of the hold down assembly couples to the dampener mount 310, as described in more detail below.

Figure 5:
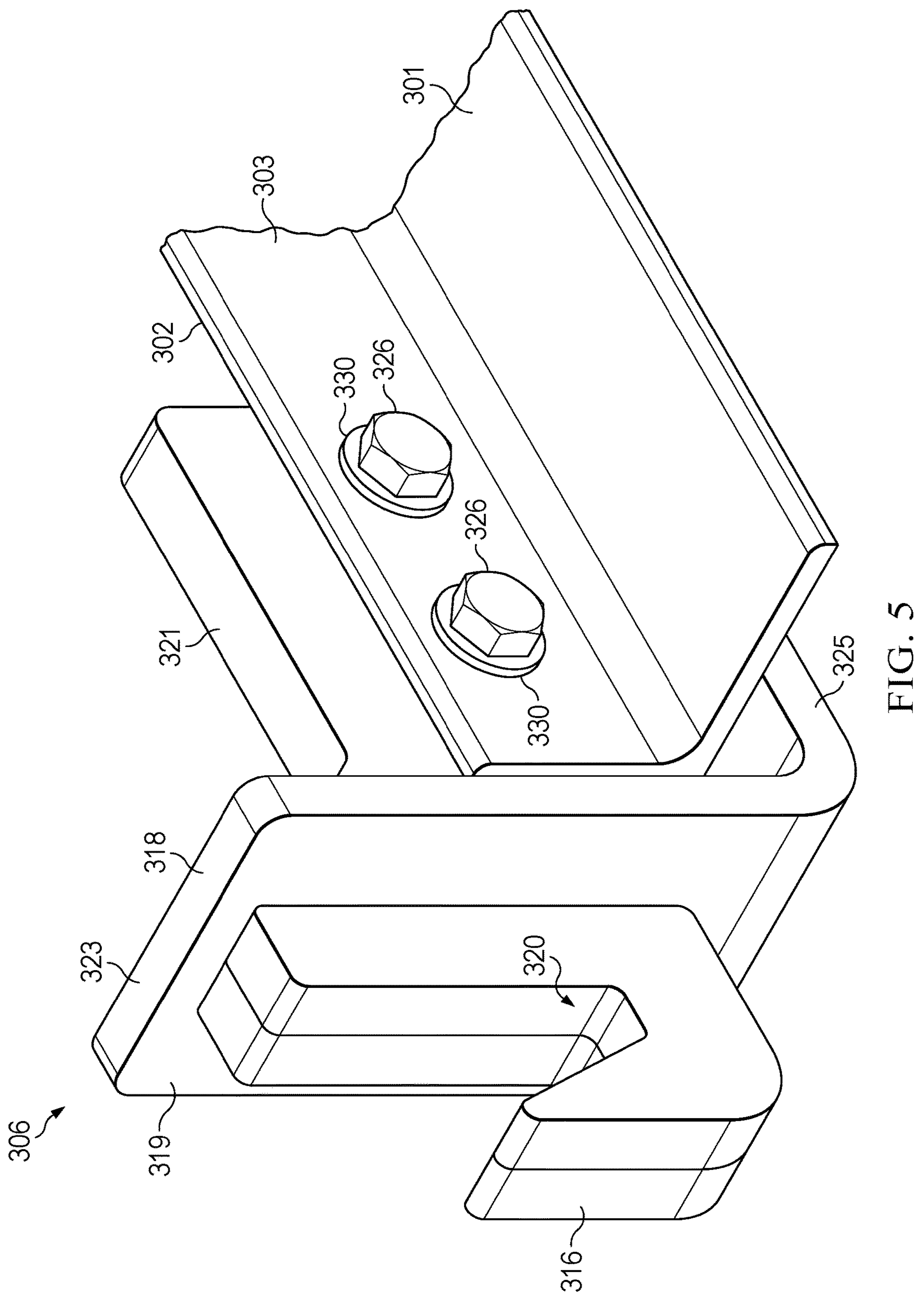
FIGS. 5-6 are zoomed-in perspective views of a lip keeper of a dock leveler, according to some embodiments of the present disclosure.
Figure 6:
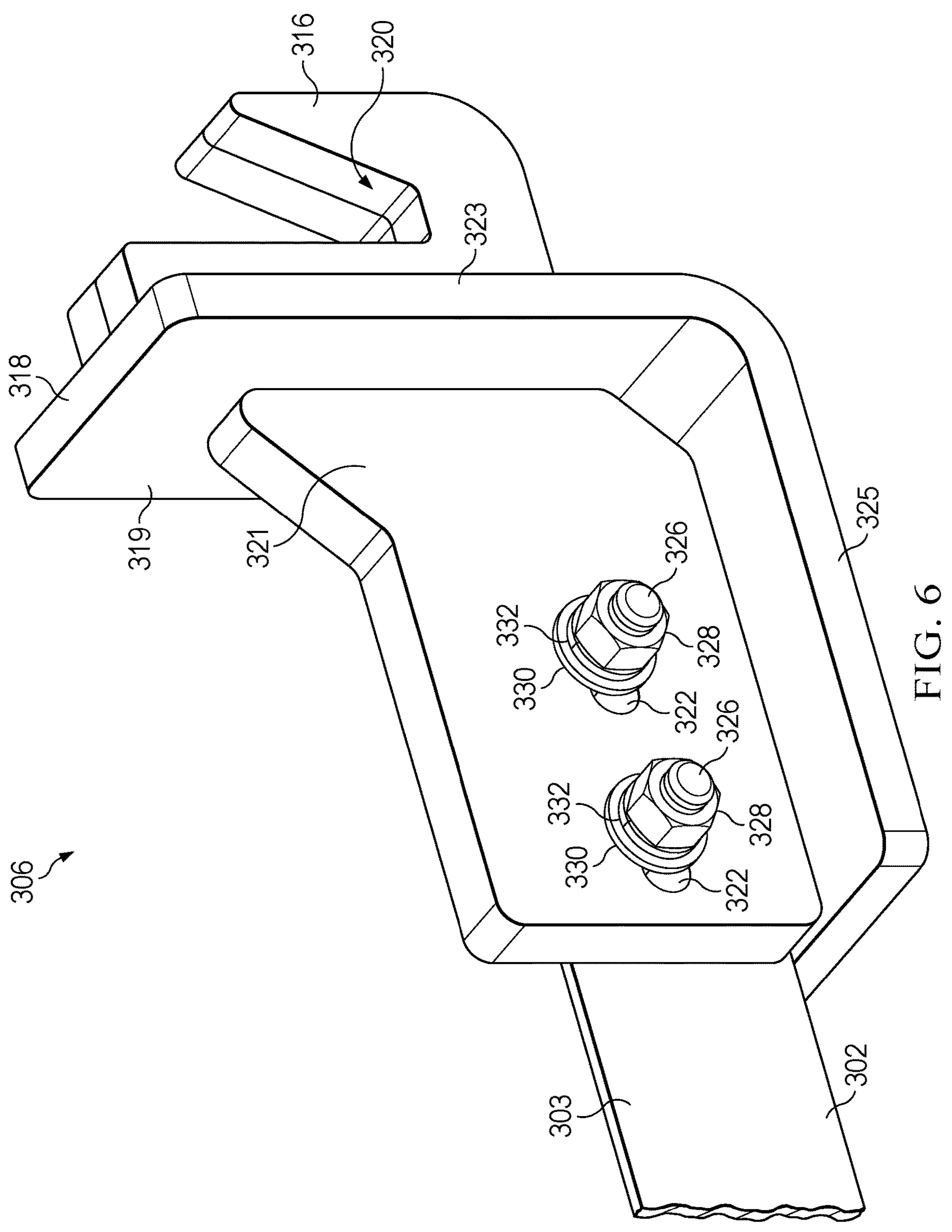
Figure 7:
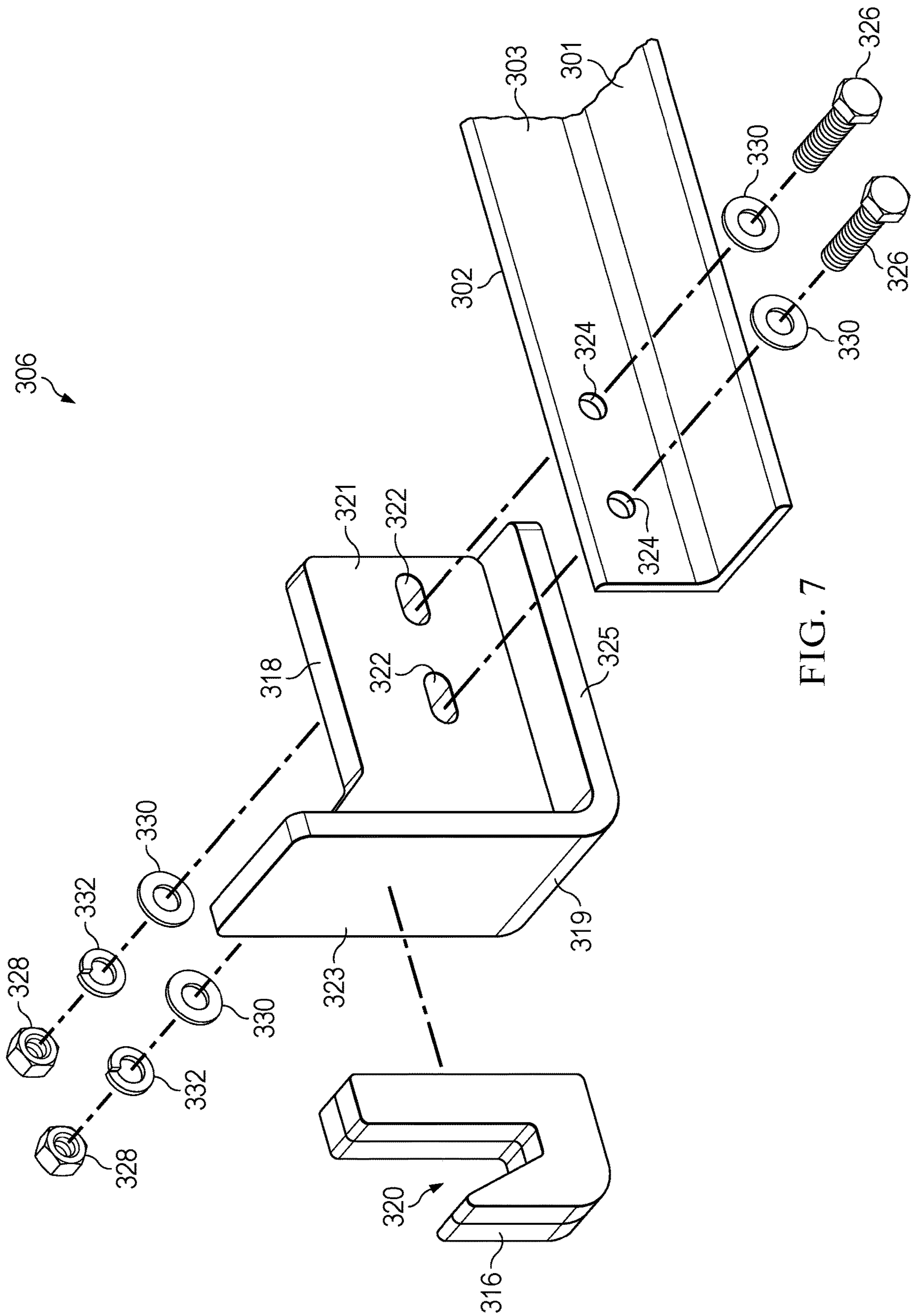
FIG. 7 is a zoomed-in exploded view of a lip keeper of a dock leveler, according to some embodiments of the present disclosure.

The chassis 300 may also include lip keepers 306, as mentioned above. FIGS. 5-6 illustrate zoomed-in views of one example embodiment of a lip keeper 306. FIGS. 5-6 show perspective side views of the lip keeper 306 assembled on the longitudinal beam 302. FIG. 7 shows an exploded view of the lip keeper 306 and the longitudinal beam 302. The lip keepers 306 may include a lip holder 316 and an adjustment bracket 318. The lip holder 316 may be configured to contact and/or hold the front end of the lip 600. Thus, the lip holder 316 includes a groove, divot, channel, or notch 320 that is configured to receive the front end of the lip 600. The adjustment bracket 318 is coupled to the lip holder 316.

The adjustment bracket 318 in this example includes an L-shaped bracket 319 and an adjustment plate 321. The L-shaped bracket 319 includes a vertical plate 323 and a horizontal plate 325. The front side of the adjustment plate 321 is coupled to the vertical plate 323 and the bottom of the adjustment plate 321 is coupled to the horizontal plate 325.

The adjustment bracket 318 may include one or more slots 322. In the example shown, the slots 322 extend through the adjustment plate 321. The longitudinal beam 302 includes one or more holes 324 that correspond to the slots 322 in the adjustment bracket 318. The slots 322 may be horizontal relative to the bottom surface 52 of the pit 51 such that they are generally arranged parallel to the bottom surface 52 or a longitudinal axis of the longitudinal beam 302. A lock system is disposed between the corresponding slot 322 and hole 324 to couple the lip keeper 306 to the longitudinal beam 302. The lock system may include an adjustable position in which the lip keeper 306 is moveable relative to the longitudinal beam 302 and a fixed position in which the lip keeper 306 is non-moveable relative to the longitudinal beam 302. The lip keepers 306 may be longitudinally adjustable such that they can be moved forward (towards or over the front edge 56 of the pit 51) and backward (towards the back wall 54 of the pit 51). Thus, the lip keepers 306 may allow the length of the frame 300 to be adjusted.

The lock system may include any suitable structure, including, for example, a bolt-and-nut connection. A bolt 326 may extend through the slot 322 and the hole 324 to couple the adjustment bracket 318 to the longitudinal beam 302. A nut 328 may be coupled to the threaded shaft of the bolt 326 to tighten the bolt 326 onto the adjustment bracket 318 and the longitudinal beam 302. There may be washers 330 disposed over the threaded shaft of the bolt 326 on either side (or only one side) of the adjustment bracket 318 and longitudinal beam 302. A spring washer 332 may be disposed between the nut 328 and a washer 330 to add additional frictional force to the connection. This may be described as a bolt-and-nut connection.

The lip keepers 306 may be affixed to the bottom surface 52 of the pit 51 after the bolt-and-nut connection is tightened. In some embodiments, the lip keepers 306 may be coupled to the curb angle 62 along the front edge 56 of the pit 51. Thus, the location of the lip keepers 306 along the bottom surface of the pit may be adjustable. Before the bolt-and-nut connection is tightened, the lip keeper 306 may slide backwards or forwards along the slots 322 in the adjustment bracket 318 about the bolt 326. In this loosened position, the operator may move the lip keepers 306 to the desired location. Once the lip keepers 306 are disposed at the desired location, the operator may tighten the nut 328 on the threaded shaft of the bolt 326 to secure or lock the adjustment bracket 318 to the longitudinal beam 302. Once the adjustment bracket 318 is secured or locked in a tightened position, the adjustment bracket 318 may be welded or may be fastened to the bottom surface 52 of the pit 51 using bolts or other means.

In the illustrated embodiment, there are two slots 322 and two corresponding holes 324. However, there may be any number of slots 322 or holes 324, including 1, 3, 4, or 5 slots 322 or holes 324. In some embodiments, the number of slots 322 and holes 324 may be the same. However, in other embodiments, there may be a different number of slots 322 than holes 324. In some embodiments, the adjustment bracket 318 may include holes or other types of openings rather than slots 322. In some embodiments, the longitudinal beam 302 may include slots or other openings rather than holes. Although the adjustment bracket 318 and the longitudinal beam 302 are coupled using a bolt-and-nut connection, any other suitable connection may be used. In some examples where the lip keepers are adjustable only in horizontal directions, shims may be used under the lip keepers to level the dock.

Returning to FIG. 4, the chassis 300 may also include a safety bar 334. The safety bar 334 may be rotatably coupled to a safety bar bracket 336. The safety bar bracket 336 may include an opening through which a bolt-and-nut connection is disposed. The bolt-and-nut connection may be the same or similar to that described above for the lip keepers 306 (described in reference to FIGS. 5-7). The safety bar 334 may include an opening sized and shaped for the threaded shaft of the bolt to pass through. Thus, the safety bar 334 may be capable of rotating, pivoting, or otherwise moving on the shaft of the bolt when the bolt-and-nut connection is loosened or not tightened.

In a stowed position, the safety bar 334 may be generally horizontal so that the safety bar 334 does not interfere with the operation of the dock leveler 100. To move the safety bar 334 into an engaged position, an operator may rotate or pivot the safety bar 334 to an upright or vertical position. The operator may then tighten the nut on the shaft of the bolt to tighten the bolt-and-nut connection. This may secure the safety bar 334 in an engaged position. In the engaged position, the safety bar 334 may prevent the deck 400 from lowering past a certain point. In some embodiments, the safety bar 334 may be sized and shaped to prevent the deck 400 from moving downwards past a certain point while an operator is performing maintenance on the dock leveler 100. In other embodiments, any suitable safety system may be used.

Figure 8:
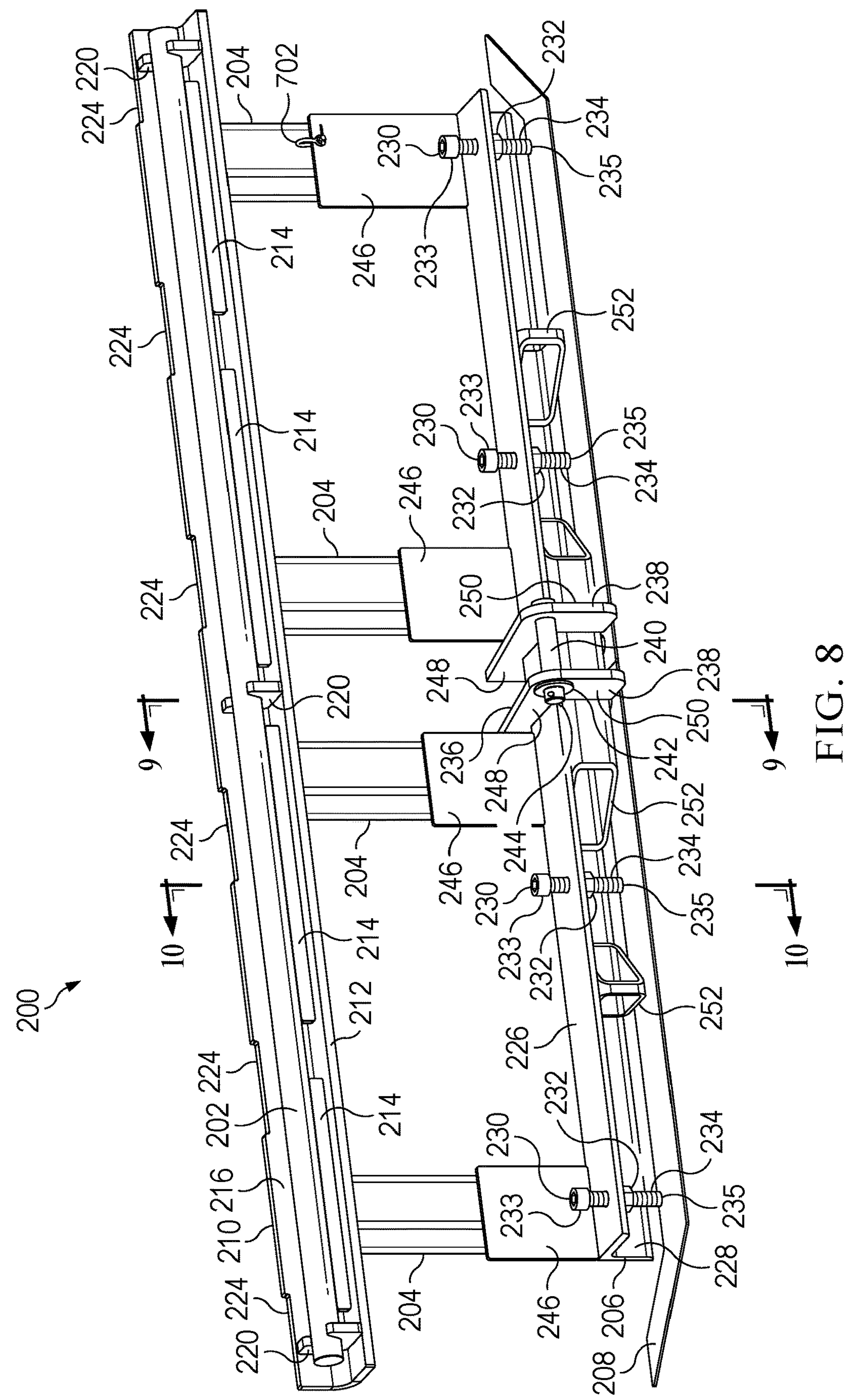
FIG. 8 is a perspective view of a leg bracket assembly of a dock leveler, according to some embodiments of the present disclosure.
Figure 9:
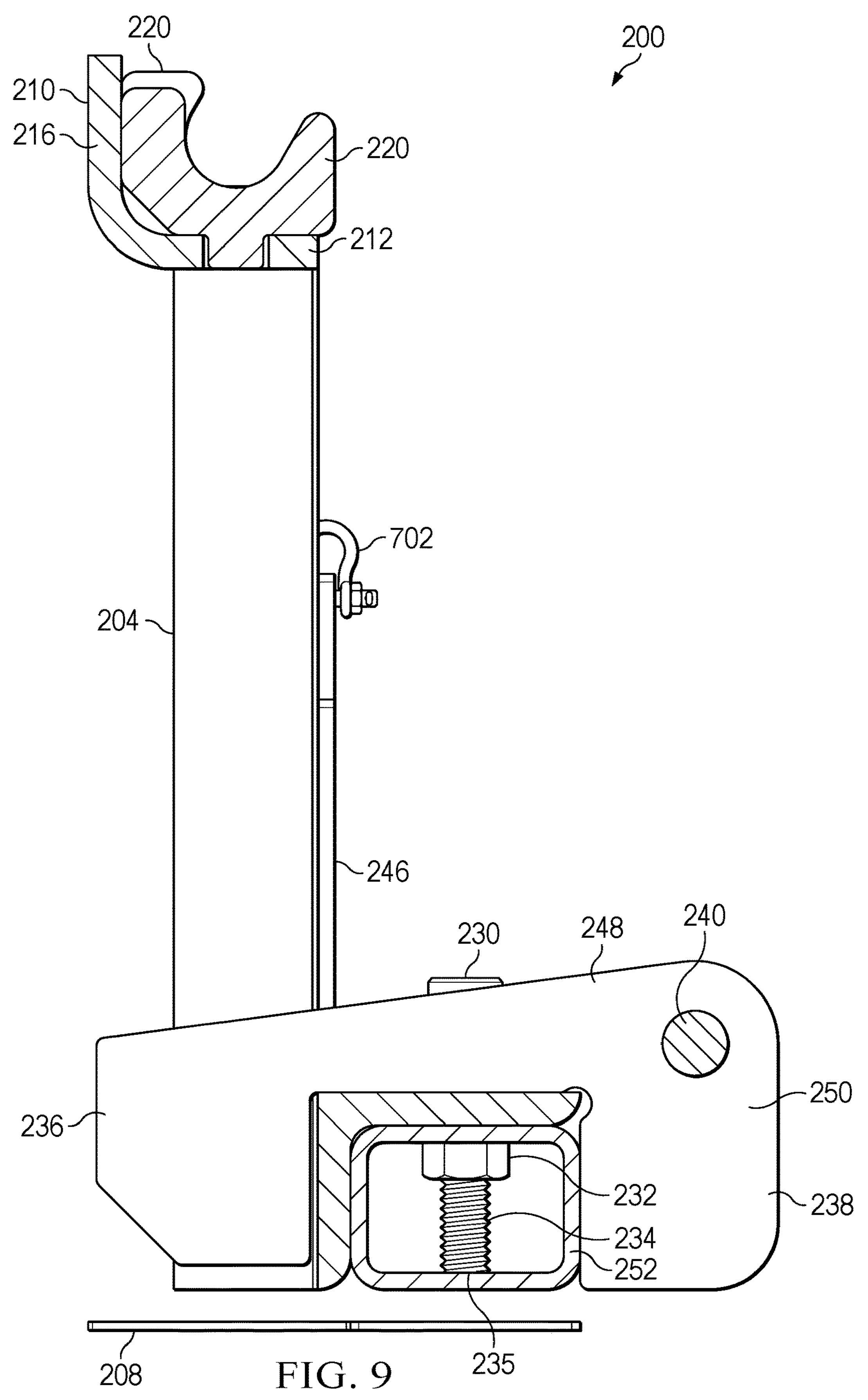
FIGS. 9-10 are cross-sectional views of the leg bracket assembly along the lines shown in FIG. 5, according to some embodiments of the present disclosure.
Figure 10:
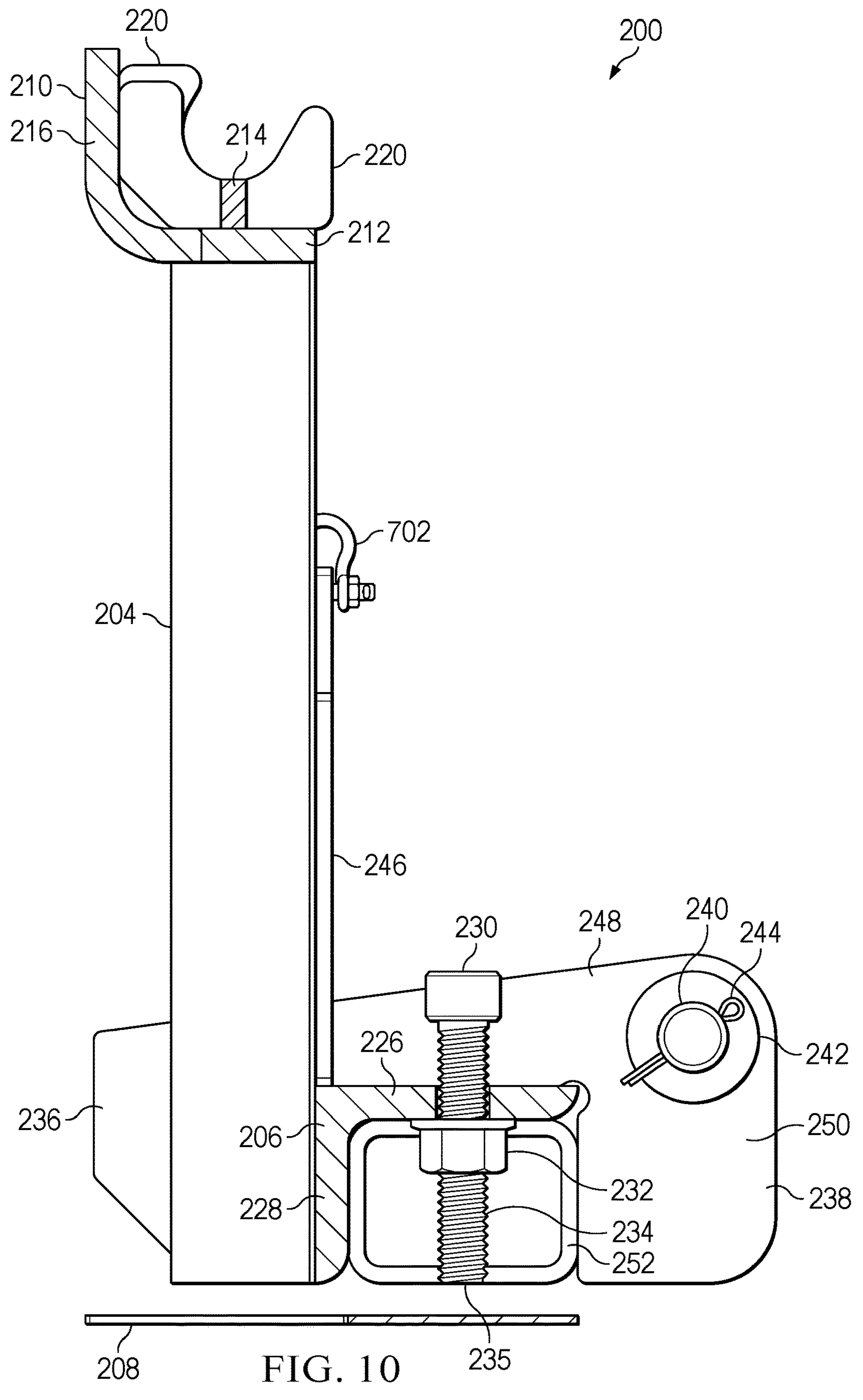

FIG. 8 shows a perspective view of the leg bracket assembly 200, according to some embodiments of the present disclosure. FIGS. 9-10 show cross-sectional views of the leg bracket assembly 200 along the corresponding lines shown in FIG. 8. Deck hinge bracket 210 is coupled to the top portion of each leg 204. The deck hinge bracket 210 includes a bottom plate 212, stock plates 214, rear plate 216, and C-brackets 220. The bottom plate 212 is coupled to a top portion of each leg 204. In some embodiments, the bottom plate 212 may be welded to the legs 204. In other embodiments, the bottom plate 212 may be fastened to the legs 204 using bolts or other means. The stock plates 214, which, in other embodiments, may be any type of external support, are coupled to the top surface of the bottom plate 212 to improve the rigidity and strength of the bottom plate 212. These may support and be disposed directly under and interface with the dock hinge shaft 202 to properly distribute support for loads or the loading dock 100. A rear plate 216 is coupled (e.g., welded, bolted, etc.) to the bottom plate 212 and is configured to be positioned directly adjacent the rear wall of the pit. The rear plate 216 includes weld points 224 (e.g., holes, openings, etc.) to weld the rear plate 216 to a curb angle 62 along the top edge of the back wall 54. The weld points 224 may be shaped to accommodate fillet welds. In other embodiments, the weld points 224 may accommodate butt welds. Therefore, when the deck 400 is connected to the leg bracket assembly 200, the end of the deck 400 is disposed directly adjacent the dock, with only the deck hinge bracket 210 and the curb angle 62 disposed between the deck 400 and the dock 50. Unlike conventional dock levelers, the deck 400 of the dock leveler 100 is disposed close enough to the dock 50 that it does not require a plate to bridge the gap between the deck 400 and the dock 50. Thus, a transition angle, used in conventional dock levelers, is not necessary in dock levelers 100 described herein.

In some embodiments, the leg bracket assembly 200 may include one or more stock plates 214. In the illustrated embodiment, four stock plates 214 are coupled to the bottom plate 212 of the deck hinge bracket 210. However, in other embodiments, any suitable number of stock plates 214 may be used, including, for example, 1, 2, 3, 5, 6, 7, 8, 9, or 10 stock plates 214. The stock plates 214 are spaced laterally from each other but are longitudinally aligned. Thus, the stock plates 214 are colinear such that the deck hinge shaft 202 may be disposed over the entire length of each stock plate 214. Each stock plate 214 may extend along a portion of the length of the bottom plate 212. The stock plate 214 have a length that is larger than a height or width. In some embodiments, the stock plates 214 may extend over a majority of the length of the bottom plate 212.

In the illustrated embodiment, the leg bracket assembly 200 includes three C-shaped brackets 220. However, in other embodiments, any suitable number of C-shaped brackets 220 may be used, including, for example, 1, 2, 4, 5, 6, 7, 8, 9, or 10 C-shaped brackets 220. The C-shaped brackets 220 are spaced from each other along a length of the bottom plate 212. A C-shaped bracket 220 is coupled proximate to each end of the bottom plate 212 and the third C-shaped bracket 220 is coupled to the center of the bottom plate 212. Two stock plates 214 are coupled to the bottom plate 212 between the C-shaped brackets 220. The deck hinge shaft 202 may be disposed in the C-shaped brackets 220 such that a bottom of the deck hinge shaft 202 contacts a top of the stock plates 214. The stock plates 214 may extend over a sufficient length of the bottom plate and contact a sufficient amount of the deck hinge shaft 202 to continuously support the deck hinge shaft 202. The stock plates 214 may prevent the deck hinge shaft 202 from bending or breaking where it is not directly coupled to or contacting a part of the leg bracket assembly 200.

The deck hinge shaft 202 may be coupled to one or more C-shaped brackets 220. In some embodiments, the deck hinge shaft 202 is coupled to the two C-shaped brackets 220 on either end of the deck hinge bracket 204. In some embodiments, the deck hinge shaft 202 is coupled to each C-shaped bracket 220. In some embodiments, the deck hinge shaft 202 is coupled to the stock plates 214.

The adjustment bracket 206 is coupled to the bottom portion of each leg 204. In some embodiments, the adjustment bracket 206 may be welded to the legs 204. In other embodiments, the adjustment bracket 206 may be fastened to the legs 204 using bolts or other means. The adjustment bracket 206 may include a top or horizontal plate 226 and a back or vertical plate 228. In some embodiments, the horizontal plate 226 may be welded to the vertical plate 228. In other embodiments, the horizontal plate 226 may be fastened to the vertical plate 228 using bolts or other means.

Two or more bolts 230 may be disposed through holes in the horizontal plate 226 of the adjustment bracket 206 so that the head 233 of the bolt 230 is disposed above the horizontal plate 226 with the shaft 234 of the bolt 230 extending downwards through the hole of the horizontal plate 226. A nut 232 may be threadedly coupled to the threaded shaft 234 of the bolt 230 and may be disposed on the shaft 234 below the horizontal plate 226. The base plate 208 may be coupled to the bottom surface of the pit 51 below the adjustment bracket 206 such that the shafts 234 of each bolt 230 are above the base plate 208. The base plate 208 is separate from the adjustment plate 206 so that they are not coupled. The bottom surface of the horizontal plate 226 may rest on the top of the nuts 232 and the bottom end 235 of the shaft 234 may contact and rest on the base plate 208. In some embodiments, the bottom end 235 of the shaft 234 does not include a foot (and, thus, is footless) that distributes weight to the base plate. Instead, the bottom end 235 may be the same diameter as the rest of the shaft 234 and may not include any extensions. The bottom end 235 is not coupled to another part and, thus, is not coupled to the base plate 208. Only the bottom surface of the bottom end 235 may contact the base plate 208.

During installation or maintenance of the dock leveler 100, the operator may adjust a level or height (and, thus, a stability) of the leg bracket assembly 200 by adjusting the amount of the shaft 234 of the bolt 230 that extends below the horizontal plate 226. In some embodiments, the operator may rotate the bolts 230 until the shaft 234 of each bolt 230 contacts and presses against the base plate 208 and the adjustment bracket 206 is disposed at the desired height and/or level. Thus, the adjustment bracket 206 and base plate 208 may allow for adjustment and stabilization of the dock leveler 100 without using shims. In some embodiments, the operator may hold the nut 232 while rotating the bolt 230 to adjust the bolt 230. In some embodiments, the nut 232 may be coupled to the horizontal plate 226. The nut 232 may be coupled to the bottom of the horizontal plate 226 by, for example, welding. In some embodiments, the holes in the horizontal plate 226 may be threaded and there may not be a nut 232.

There may be adjustment holes 464 in the deck 400 (shown in FIG. 14) through which the operator can access the bolts 230 disposed through the adjustment bracket 206. The adjustment holes 464 align with the bolts 230 so that the operator can stick a tool through the adjustment holes 464 from the top surface of the deck 400 to contact and rotate the bolts 230. The adjustment holes 464 may be accessible when the deck 400 is in a horizontal or stowed position. In some embodiments, the adjustment holes 464 may be accessible when the deck 400 is at any angle relative to the horizontal, such as, for example, when the deck 400 is in the extended, engaged, or below-dock position.

The leg bracket assembly 200 also includes a pivot boss 236 coupled to the adjustment bracket 206. In some embodiments, the pivot boss 236 is centered on the adjustment bracket 206. The pivot boss 236 includes two mounting plates 238 coupled to a central portion of the adjustment bracket 206 such that the mounting plates 238 are spaced from each other. In some embodiments, the mounting plates 238 may be welded to the adjustment bracket 206. In other embodiments, the mounting plates 238 may be fastened to the adjustment bracket 206 using bolts or other means. A bar or rod 240 may extend across the space between the mounting plates 238 and couple to the mounting plates 238. In some embodiments, the rod 240 may extend through holes in the mounting plates 238. Washers 242 may be disposed over the rod 240 on either side of the mounting plates 238 to hold the rod 240 in place. A pin 244 may be inserted through a hole in the rod 240 to secure the rod 240 in the mounting plates 238. In some embodiments, the rod 240 is pivotably, rotatably, or otherwise moveable relative to the mounting plates 238. However, in other embodiments, the rod 240 is non-moveably fixed to the mounting plates 238. The lower arm of the lift arm assembly 500 is pivotably or rotatably coupled to the rod 240 of the pivot boss 236, as described in more detail below.

The mounting plates 238 include a horizontal portion 248 and a vertical portion 250. The horizontal portion 248 of the mounting plate 238 extends over the top of the horizontal plate 226 of the adjustment bracket 206. The horizontal portion 248 of the mounting plates 238 may be welded to the horizontal plate 226 of the adjustment bracket 206 or may be fastened to the horizontal plate 226 of the adjustment bracket 206 using bolts or other means. The vertical portion 250 of the mounting plates 238 extends downward from the horizontal portion 248 over a front edge of the horizontal plate 226 of the adjustment bracket 206. The holes of the mounting plates 238 and the rod 240 disposed in the holes may be located at an intersection of the horizontal portion 248 and the vertical portion 250. Thus, the rod 240 is located proximate to the adjustment bracket 206. In some embodiments, the rod 240 is spaced vertically above the horizontal plate 226 of the adjustment bracket 206. In some embodiments, the rod 240 is spaced horizontally forward from the front edge of the horizontal plate 226 of the adjustment bracket 206.

Because the rod 240 is proximate to the adjustment bracket 206 with only a small space therebetween, the pivot boss 236 may not need to be independently shimmed or adjusted. Instead, the operator need only adjust the level and/or height of the adjustment bracket 206 as described above to adjust the level and/or height of the pivot boss 236. Because the adjustment of the adjustment bracket 206 is shimless, the adjustment of the pivot boss 236 may also be shimless. Additionally, because the pivot boss 236 is rigidly coupled to the adjustment bracket 206, this may prevent flexing or distortion of the pivot boss 236 during operation. The pivot boss 236 is only coupled to the adjustment bracket 206 (or the support bracket 252 as discussed below), the pivot boss 236 may not contact or be coupled to the bottom surface 52 of the pit 51 and may not include an additional lower support.

A support bracket 252 may be coupled to the bottom of the horizontal plate 226 of the adjustment bracket 206 underneath the pivot boss 236. The support bracket 252 may provide additional support and stability to the adjustment bracket 206 and the pivot boss 236. In some embodiments, the vertical plate 228 of the adjustment bracket 206 and/or the vertical portion 250 of the mounting plates 238 may be coupled to the support bracket 252. The vertical plate 228 of the adjustment bracket 206 and/or the vertical portion 250 of the mounting plates 238 may be welded to the support bracket 252 or may be fastened to the support bracket 252 using bolts or other means. Additional support brackets 252 may be coupled to the adjustment bracket 206 below the horizontal plate 226 to provide additional support and/or stability to the adjustment bracket 206 and, thus, to the leg bracket assembly 200 as a whole.

In some embodiments, the mounting plates 238 may be coupled such that there is a space between the two mounting plates 238 for receiving the rod 240. In some embodiments, the pivot boss 236 includes one mounting plate 238 and, in other embodiments, the pivot boss 236 includes more than two mounting plates 238. In embodiments where a non-mechanical lift assembly is used (e.g. hydraulic or air powered assemblies) the pivot boss 236 may be pivotably coupled to the non-mechanical lift assembly.

In some embodiments, the leg bracket assembly 200 may include additional support plates 246. The support plates 246 may be coupled to the legs 204. In some embodiments, the support plates 246 may be coupled to the legs 204 directly above the portion where the adjustment bracket 206 is coupled. The support plates 246 may provide additional support to the legs 204. A shackle 702 is coupled to one of the support plates 246. The shackle 702 connects to the chain 704 of the lip actuation assembly 700, as described in more detail below.

Figure 11:
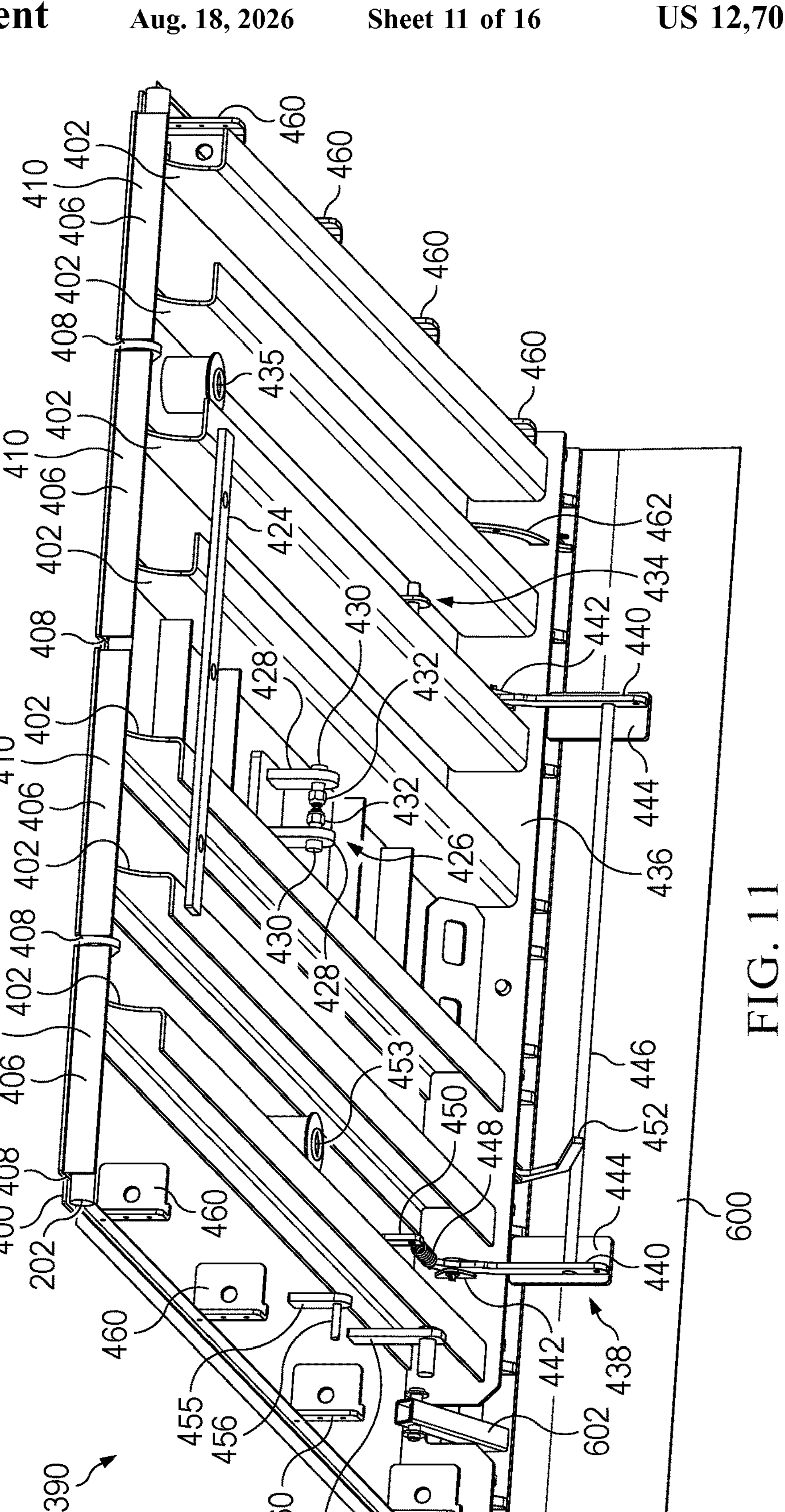
FIG. 11 is a perspective view of a bridge assembly of a dock leveler, according to some embodiments of the present disclosure.

FIG. 11 shows the bottom of the deck 400 and lip 600, according to some embodiments of the present disclosure. As discussed earlier, the back end of the deck 400 is pivotably or rotatably coupled to the deck hinge shaft 202, which is fixedly coupled to the leg bracket assembly 200. The deck 400 may be coupled to one or more hinge brackets 406. The hinge brackets 406 may include a top plate 408 coupled to the bottom of the deck platform 400 along the back end and a vertical plate 410 attached to the top plate 408 such that it extends downward around the back side of the deck hinge shaft 202. The hinge bracket 406 may contact and rotate about the deck hinge shaft 202 as the deck 400 rotates upwards and downwards. In some embodiments, the vertical plate 410 may be sized and shaped to prevent over-rotation of the deck 400. For example, the vertical plate 410 may be sized to contact the stock plates 214 below the deck hinge shaft 202, preventing further upward rotation of the deck 400. The top plate 408 of the hinge bracket 406 may be welded to the bottom of the deck 400 or may be fastened to the deck 400 using bolts or other means.

Figure 12:
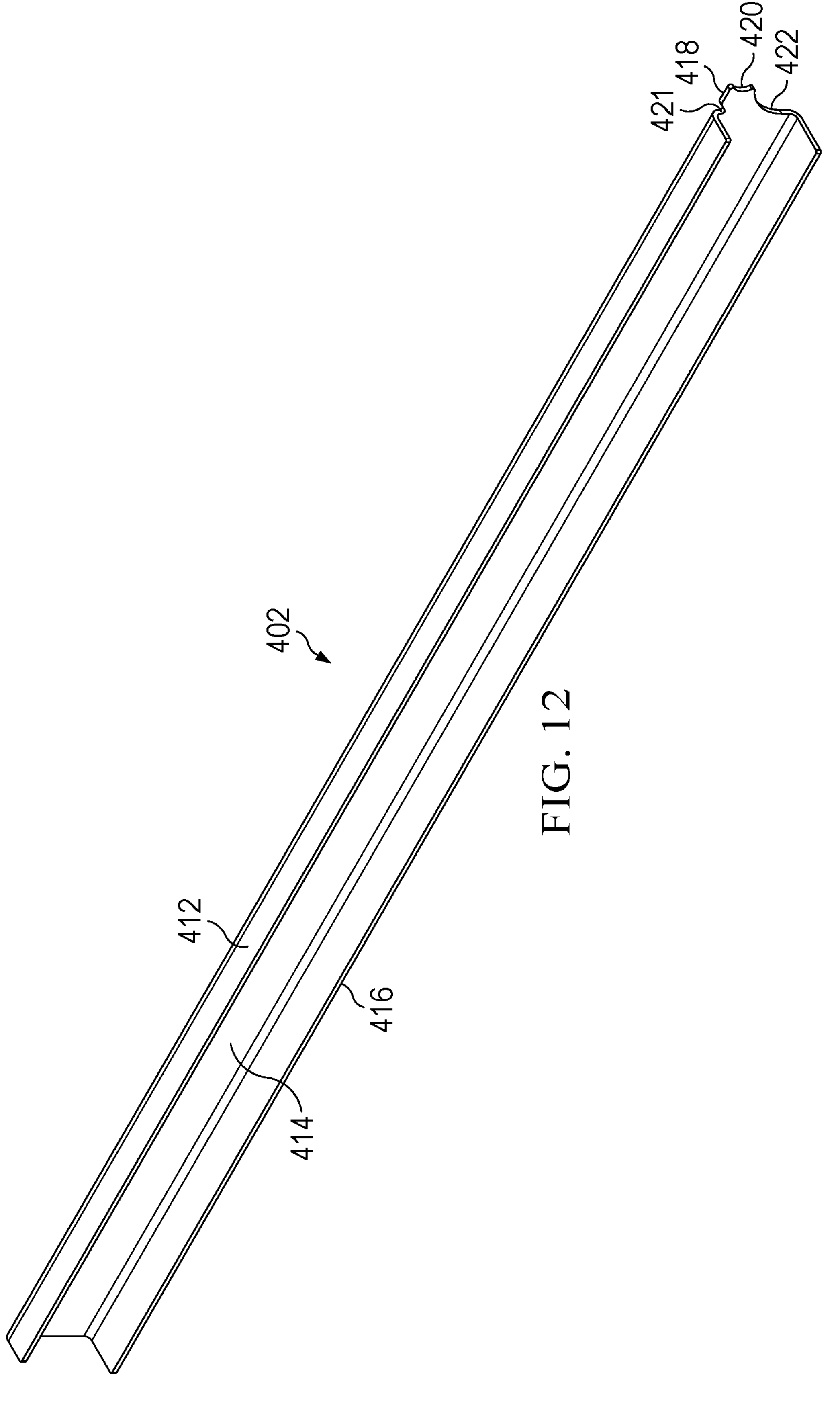
FIG. 12 is a perspective view of a C-shaped beam of a dock leveler, according to some embodiments of the present disclosure.

One or more C-shaped beams 402 may be coupled to the bottom of the deck 400. The top plate 412 of the C-shaped beam 402 may be welded to the bottom of the deck 400 or may be fastened to the deck 400 using bolts or other means. The C-shaped beams 402 may extend between the back end and front end of the deck 400. FIG. 12 illustrates a C-shaped beam 402, according to some embodiments of the present disclosure. Thus, the C-shaped beams 402 may include a top horizontal plate 412 that may be coupled to the bottom of the deck 400, a vertical plate 414 extending from a side of the top horizontal plate 412, and a bottom horizontal plate 416 extending generally horizontally from the bottom of the vertical plate 414. The C-shape of the beam 402 may provide additional support and rigidity to the deck 400. The plates 412, 414, 416 may be welded together or may be fastened to each other using bolts or other means.

The back end of the C-shaped beams 402 may be shaped to contact and/or rotate around the deck hinge shaft 202. The C-shaped beam 402 may include an extension 418 that includes a cutout 420. The cutout 420 may be V-shaped such that the bottom of the "v" cuts inward towards the rest of the beam 402. The cutout 420 may be shaped to contact and/or rotate around the deck hinge shaft 202. There may be a concave portion 422 of the extension 418 that is shaped to avoid the other parts of the leg bracket assembly 200 to allow the C-shaped beams 402 to rotate easily around the deck hinge shaft 202. There may be a divot 421 disposed at the base of the extension. The divot 421 may be a bend relief for the top horizontal plate 412 of the C-shaped beam 402. In some embodiments, the divot 421 may allow the extension to extend beneath the hinge bracket 406. The extension 418 may be coupled to the C-shaped portion of the C-shaped beam 402. In some embodiments, the extension 418 is coupled to a bottom surface of the top horizontal plate 412. In some embodiments, the extension 418 is coupled to a surface of the vertical plate 414. In some embodiments, the extension 418 is coupled to the back edge of the C-shaped beam 402. The extension 418 may be welded with one or more of the plates 412, 414, 416 or may be fastened to them using bolts or other means.

In conventional systems, the beams coupled to the bottom of the deck platform do not extend all the way to the back end of the deck and the deck hinge shaft but instead only extend partially towards the back end. Unlike conventional systems, the extension 418 may advantageously allow the beam 402 to extend along an entirety of deck 400. This may provide additional support to the deck 400. In other embodiments, the cutout 420 may be rounded or curved. In yet other embodiments, the beams 402 may instead be J-shaped such that the beams include the same vertical plate and bottom horizontal plate, but a smaller top horizontal plate.

Returning to FIG. 11, the deck 400 may also include one or more connection points for connecting to other parts of the dock leveler 100. The deck 400 includes a spring mounting plate 424 that is coupled to the bottom plate 416 of one or more C-shaped beams 402. In other embodiments, the spring mounting plate 424 may be coupled to the bottom of the deck 400. The spring mounting plate 424 includes one or more holes that the springs of the lift arm assembly 500 couple to, as described in more detail below. The spring mounting plate 424 may be welded to the bottom of the deck 400 or may be fastened to the bottom of the deck 400 using bolts or other means.

The deck 400 also includes an upper arm mount 426 that is configured to couple to the upper arm 504 of the lift arm assembly 500, as described in more detail below. The upper arm mount 426 may include one or more mounting plates 428. In the illustrated embodiment, there are two mounting plates 428. The upper arm 502 may be pivotably, rotatably, or otherwise moveably coupled to the upper arm mount 426. The upper arm 502 may be coupled to each mounting plate 428 with a bolt-and-nut connection similar to that described in reference to the lip keepers 306. The shaft of a bolt 430 may extend through a hole in one mounting plate 428 and a corresponding hole in the upper arm 504. A nut 432 may be disposed on the end of the shaft of the bolt 430 such that it is proximate to or contacts the upper arm 502. The same bolt-and-nut connection may couple the other mounting plate 428 to another part of the upper arm 504. The nut 432 may be tightened to minimize sliding or movement of the upper arm 504 along the bolt 430 while allowing the upper arm 504 to pivot or rotate around the bolt 430. The mounting plates 428 may be welded to the bottom of the deck 400 or may be fastened to the bottom of the deck 400 using bolts or other means. In some embodiments, the mounting plates 428 may be coupled by a horizontal plate and the horizontal plate may be coupled to the bottom of the deck 400.

A ratchet bar mount 434 similar to the dampener mount 310 described above is coupled to the bottom of the deck 400. The hold down assembly 550 may be coupled to both the ratchet bar mount 434 on the deck 400 and the dampener mount 310 on the chassis 300, as described in more detail below.

In some embodiments, there is a release chain hole 435 extending through the deck platform 400 proximate the location of the hold down assembly 550. As described below, the release chain may release the hold down assembly 550, thus allowing the lift arm assembly 500 to push the deck 400 upwards into a raised position.

A kicker plate 436 may be coupled to the front end of the deck 400 such that the kicker plate 436 extends generally vertically downward from the front end. The kicker plate 436 may provide additional stability to the deck 400 and may prevent the lip 600 from rotating or moving underneath the deck 400. The kicker plate 436 may also prevent debris from falling or moving into the pit 51. The kicker plate 436 may also be an attachment surface for other parts of the dock leveler, including deck hinge lug, as described in more detail below.

A safety leg assembly 438 may be coupled to the kicker plate 436. The safety leg assembly 438 may include two or more safety legs 440 that may be pivotably, rotatably, or otherwise moveably coupled to the back side of the kicker plate 436. The safety legs 440 may be coupled to the kicker plate 436 using a safety leg mount 442 similar to the dampener mount 310 described above. Support plates 444 may be coupled to the bottom of each safety leg 440. Each end of a safety bar 446 may be disposed between the support plates 444 and the safety legs 440, thus fixedly coupling the safety bar 446 to the safety leg assembly 438. The safety bar 446 extends between the safety legs 440 and support plates 444. The top end of at least one of the safety legs 440 may be coupled to a spring 448, which is coupled to mounting plate 450 coupled to and extending downward from the bottom of the deck 400. The spring 448 may bias the top of the safety leg assembly 438 backward, thus biasing the safety bar 446 and support plates 444 forward. A lip kickout plate 452 may be pivotably, rotatably, or otherwise moveably coupled to the front side of the kicker plate 436. The lip kickout plate 452 may extend from the front side of the kicker plate 436 below the kicker plate 436 and to the back side of the safety bar 446.

The safety leg assembly 438 ensures that the deck 400 does not drop all the way to the bottom surface 52 of the pit 51 when a truck or trailer unexpectedly pulls away causing the bridging assembly 390 to slip or fall off of the edge of the truck or trailer. The safety leg assembly 438 may catch the bridging assembly 390 so that it does not fall to the bottom surface 52 of the pit 51. In some embodiments, a safety leg assembly chain (not shown) may be used to move the safety leg assembly 438 backwards towards the bottom surface of the deck platform 400, thereby allowing the deck 400 to lower below the stowed position to the bottom surface 52 of the pit 51. The safety leg assembly chain may be passed through safety leg assembly chain hole 453 for easier, and safer, access to the safety leg assembly chain. This allows a worker to move the safety leg assembly 438 and the deck 400.

A lip safety plate 462 is disposed through a slot in the kicker plate 436. A The lip safety plate 462 includes two holes on a first end and a hole on a second end. The lip safety plate 462 is curved from the first end to the second end. An attachment plate is disposed on the front side of the kicker plate 436 that includes a rod disposed through a first hole in the attachment plate and a bolt disposed in a second hole in the attachment plate. In the retracted position, the rod and bolt are disposed through the two holes on the first end of the lip safety plate 462 such that the lip safety plate 462 does not interfere with operation of the dock leveler 100. When an operator performs maintenance, the bolt and rod are removed and the lip safety plate slides forward through the kicker plate 436 so that the lip safety plate 462 extends out and upward. The rod may be placed back through the attachment plate and through the hole on the second end of the lip safety plate. This secures the lip safety plate 462 in an engaged position. In the engaged position, the lip safety plate 462 prevents the lip 600 from moving or falling downward during maintenance of the dock leveler 100.

A link pivot plate mount 454 may be coupled to the bottom of the deck 400. The link pivot plate mount 454 may include a pivot bar 456. A link pivot plate of the lip actuation assembly 700 may be pivotably, rotatably, or otherwise moveably coupled to the lip pivot plate mount 454, as described in more detail below. A lip actuation bracket 602 may be coupled to the lip 600 and may extend under the deck 400 when the lip 600 is in a stowed position. The lip actuation assembly 700 may couple to the lip actuation mount 454, the lip actuation bracket 602, and a support plate 246 of the leg bracket assembly (described above), as described in more detail below.

The deck 400 may include one or more deck support brackets 460 that may be coupled to the sides or proximate to the sides of the deck 400. The toe guard assembly 102 may be coupled to the deck support brackets 460. The deck support brackets 458 may also provide additional support and rigidity to the deck 400.

Figure 13:
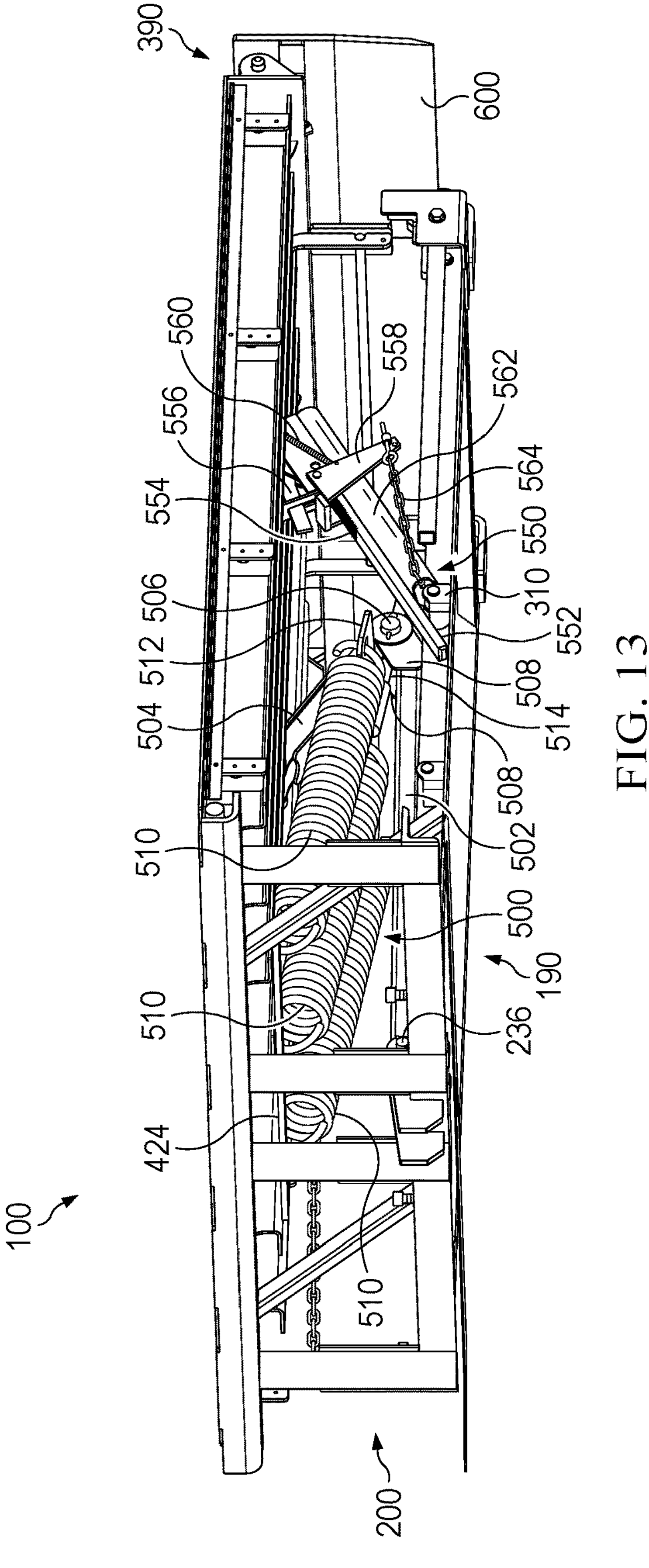
FIG. 13 is a perspective view of a dock leveler, according to some embodiments of the present disclosure.

FIG. 13 shows a back perspective view of the dock leveler 100 (with the toe guard assembly 102 removed), according to some embodiments of the present disclosure. The lift arm assembly 500 and the hold down assembly 550 can be seen in FIG. 13. The lift arm assembly 500 includes a lower arm 502 and an upper arm 504. A first end of the lower arm 502 is rotatably coupled to the pivot boss 236 (described above) and the second end is rotatably coupled to a first end of the upper arm 504. The second end of the upper arm 504 is rotatably coupled to the upper arm mount 426 (described above).

The second end of the lower arm 502 and the first end of the upper arm 504 may be hingedly coupled so that the arms 502, 504 can pivot, rotate, or otherwise move relative to each other. The second end of the lower arm 502 is coupled to pivot plates 508. A rod 506 is disposed through holes in the upper arm 504 and holes in the pivot plates 508 to couple them together. The connection may be similar to that described above in reference to the pivot boss 236. The pivot plates 508 may be fixedly coupled to the lower arm 502 through welding or may be fastened to the lower arm 502 using bolts or other means. The pivot plates 508 may allow the arms 502, 504 to have a larger pivot or rotational range. This connection between the arms 502, 504 may be referred to as a hinge or a hinged connection.

A biasing mechanism may be connected to the hinge to pull the hinge backward. The biasing mechanism may include one or more springs 510. In the illustrated embodiments, three springs 510 are shown; however, any suitable number of springs 510 may be used, including, for example, 1, 2, 4, 5, 6, 7, 8, 9, or 10 springs. The springs 510 may be connected to the spring mounting plate 424 (described above) on a first end and connected to a tensioning plate 512 on a second end. The tensioning plate 512 may be coupled to a tensioning bar 514. The rod 506 in the hinge between the arms 502, 504 may have a hole therethrough for fitting the tensioning bar 514. The tensioning bar 514 may be fixedly coupled to the rod 506.

Thus, the lift arm assembly 500 may be configured to push or move the deck 400 upwards. The springs 510 are coupled to the hinge between the arms 502, 504 via the tensioning plate 512 and tensioning rod 514. The springs 510 are biased such that the springs 510 pull the hinge backwards towards the leg bracket assembly 200. By pulling the hinge backward, the springs 510 pull the arms 502, 504 towards a vertical position. As the arms 502, 504 move towards a vertical position, they push the deck 400 upwards.

To counteract the upward force provided by the lift arm assembly 500, the hold down assembly 550 functions to hold the dock leveler 100 in a stowed position in which the deck 400 is horizontal. The hold down assembly 550 includes a ratchet mechanism that prevents motion of the deck 400 when engaged. The ratchet assembly may include a ratchet bar 552 having teeth 554. The ratchet bar 552 is pivotably, rotatably, or otherwise moveably coupled to the ratchet bar mount 434 (described above). A pawl 556 may be configured to engage with the teeth 554 of the ratchet bar 552. The pawl 556 is coupled to a tensioning plate 558 via a spring 560 connected to a first part of the tensioning plate 558. A second part of the tensioning plate 558 may be coupled to a compression spring 562 via a tensioning chain 564. The spring 560 and the compression spring 562 may hold the tensioning plate 558 such that the tensioning plate 558 biases the pawl 556 downward so that the pawl 556 contacts and holds the teeth 554 on the ratchet bar 552.

A release chain (not shown) may be coupled to the tensioning plate 558. The release chain may pass through the release chain hole 435 in the deck 400 such that an operator can hold and manipulate the release chain. The release chain may be coupled to the tensioning plate 558 so that, when an operator pulls on the chain, the tensioning plate 558 pulls against the spring 560, which pulls the pawl 556 upwards. When the pawl 556 is pulled upwards, the pawl 556 releases from the teeth 554 of the ratchet bar 552. When the pawl 556 engages the teeth 554, the deck 400 is not moveable. Thus, when the operator pulls the release chain and disengages the pawl 556 from the teeth 554, the lift arm assembly 500 may move the deck 400 upwards, as discussed in more detail above. Once the deck 400 is in an extended position, the operator may then let go of the release chain. When the operator stops pulling on the release chain, the compression spring 562 and tensioning plate 558 bias the pawl 556 downwards again. The operator may then lower the deck 400 by walking over the deck 400, for example. As the deck 400 lowers, the pawl 556 reengages the teeth 554 on the ratchet bar 552. This holds the deck 400 again in the engaged position (or in a position between the extended and engaged positions if the operator does not lower the deck 400 the full distance to the edge of the truck or trailer).

Although only one example of a hold down assembly 550 is illustrated, any suitable hold down assembly may be used.

Figure 14:
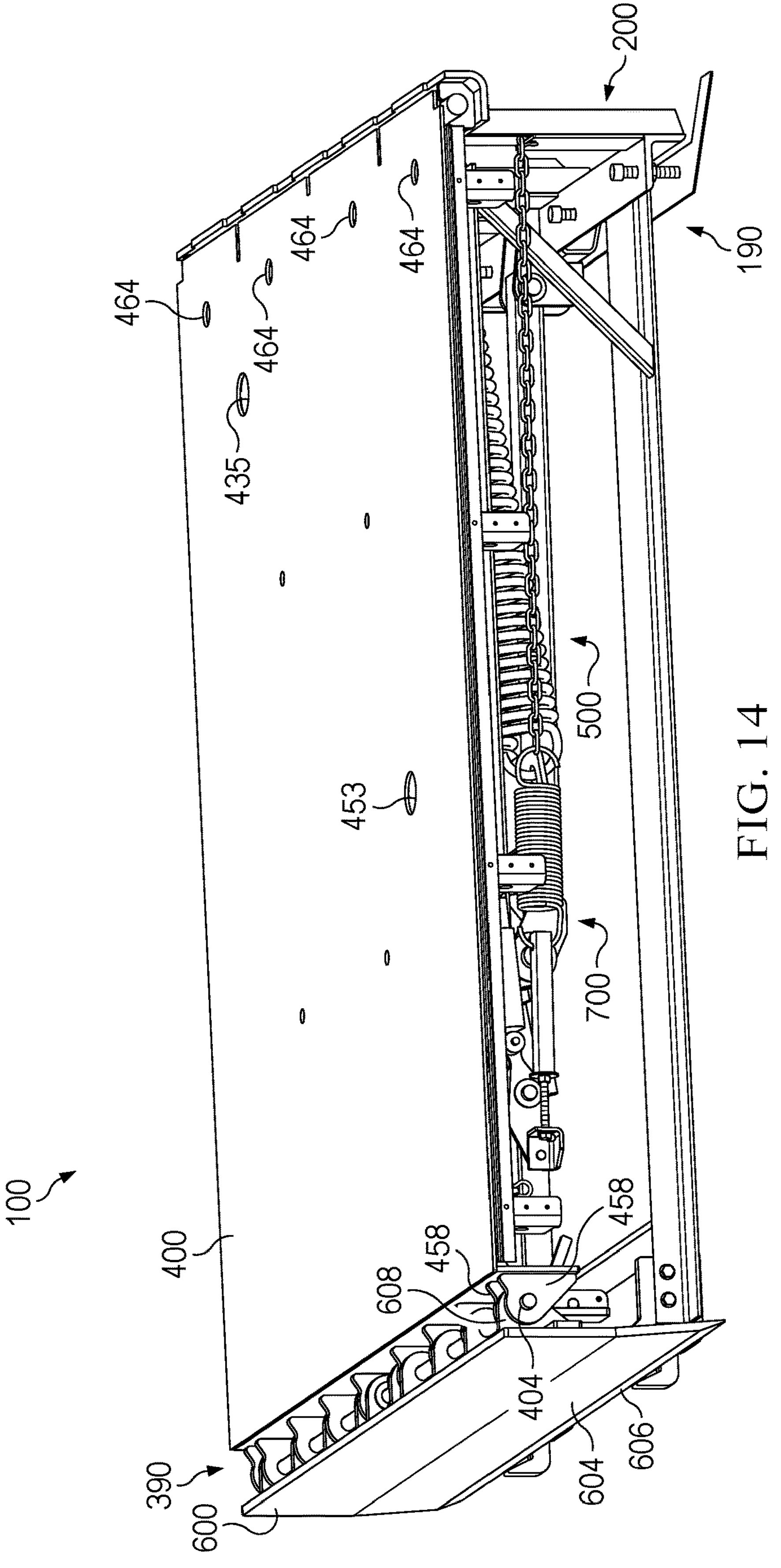
FIG. 14 is a perspective view of a dock leveler, according to some embodiments of the present disclosure.

FIG. 14 shows a front perspective view of the dock leveler 100, according to some embodiments of the present disclosure. The lip 600 includes a transition 604 and a bevel 606 to improve usability and contact with the unloading surface (e.g., trailer bed). The transition 606 of the lip 600 reduces any disturbance caused by moving from the lip 600 to the unloading surface (e.g., trailer bed). The bevel 606 further reduces disturbances in the move from the lip 600 to the unloading surface.

The front edge of the deck 400 includes one or more deck hinge lugs 458. Each deck hinge lug 458 includes a hole sized and shaped to fit the lip hinge shaft 404. The deck hinge lugs 458 are coupled to the back side of the kicker plate 436. One or more lip hinge lugs 608 are coupled to the bottom of the lip 600. Each lip hinge lug 608 includes a hole sized and shaped to fit the lip hinge shaft 404. The lip hinge lugs 608 may be similar to or the same as the deck hinge lugs 458. The deck hinge lugs 458 are offset from the lip hinge lugs 608 so that the holes in the lugs 458, 608 can be aligned for receiving the lip hinge shafts 404.

The lip hinge shaft 404 may extend through the holes in the deck hinge lugs 458 and the lip hinge lugs 608 to form a hinge between the deck 400 and the lip 600. As the lip 600 moves upward into an extended position, the lip hinge lugs 608 may rotate, pivot, or otherwise move around the lip hinge shaft 404. The deck hinge lugs 458 may be pivotably, rotatably, or otherwise moveably coupled to the lip hinge shaft 404. However, in other embodiments, the deck hinge lugs 458 may be fixedly coupled to the lip hinge shaft 404 by, for example, welding. The lip hinge shaft 404 is coupled to the lugs 458, 608 so that it does not move laterally. For example, in some embodiments, a pin may be inserted through the lip hinge shaft 404 next to one or more lugs 458, 608 to prevent lateral movement. In other embodiments, one or more clamps may be placed over the lip hinge shaft 404 next to one or more lugs 458, 608 to prevent lateral movement. In yet other embodiments, the lip hinge shaft 404 may be welded to the deck hinge lugs 458 (as discussed above) to prevent lateral movement.

In some embodiments, there may be more than one lip hinge shafts 404. Although only one example of a hinge between the deck 400 and lip 600 is shown, it should be understood that any suitable hinge may be used.

In addition, the top surface of the deck 400 may include a traction pattern, such as formed features or applied features that may increase frictional engagement of equipment passing over the lip. The traction pattern may extend onto the lip 600 and to the front end of the lip 600. Some non-limiting examples of a traction pattern include textured formations such as diamond tread or diamond plating, diagonal bumps, traction grating, perforations, or other anti-skid formations.

As the lift arm assembly 500 moves the deck 400 upward into an extended position, the momentum of the upward movement may cause the lip 600 to move upward into an extended position as well. However, the weight of the lip 600 may cause it to naturally fall downward. Thus, a lip actuation assembly 700 may be included to prevent the lip from falling and to hold it in an extended position for an operable amount of time. In some embodiments, the lip actuation assembly 700 may provide an additional upwards force that, in addition to the momentum of the deck 400, moves the lip 600 upward into an extended position.

Figure 15:
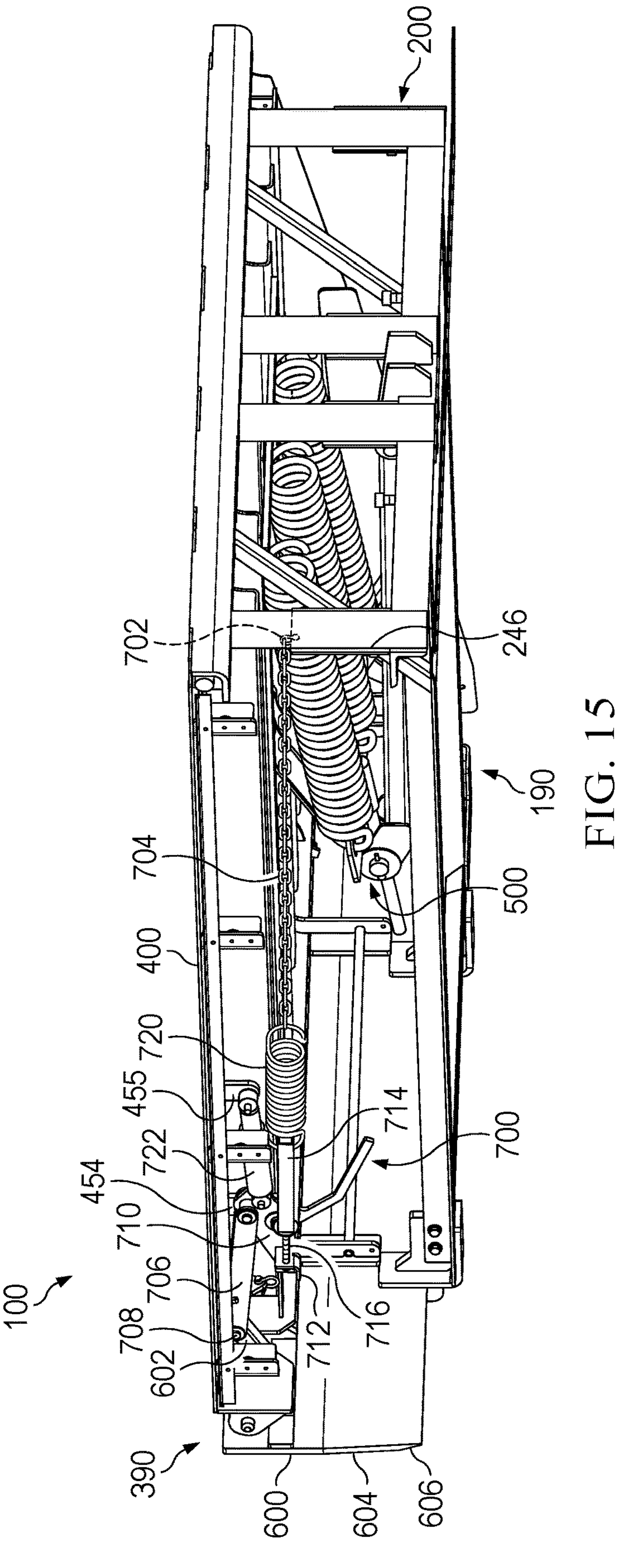
FIG. 15 is a perspective view of a dock leveler, according to some embodiments of the present disclosure.
Figure 16:
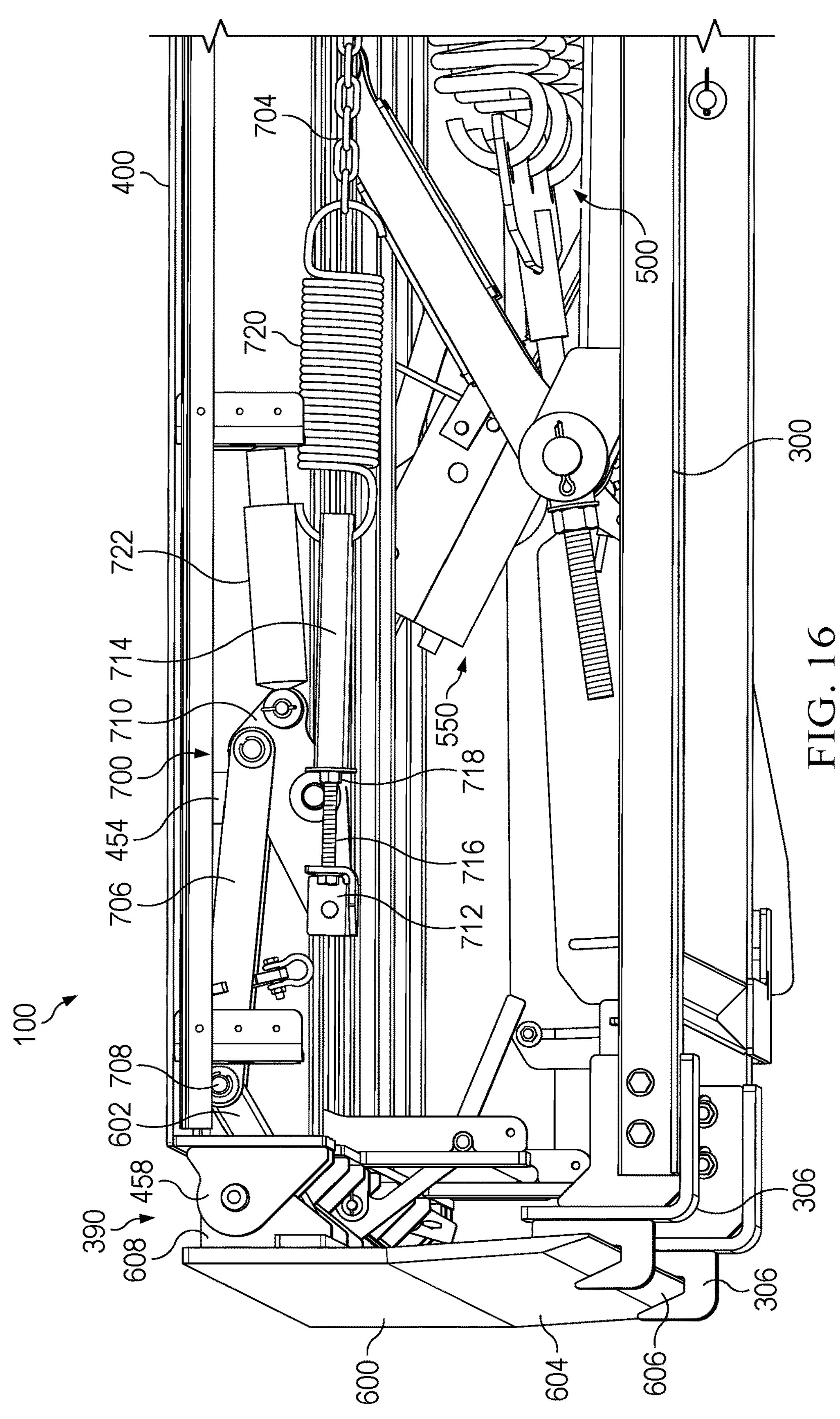
FIG. 16 is a zoomed-in perspective view of a lip and lip actuation assembly of a dock leveler, according to some embodiments of the present disclosure.

FIG. 15 shows a perspective back view of the dock leveler 100, according to some embodiments of the present disclosure. FIG. 16 shows a zoomed in view of the lip actuation assembly 700 of FIG. 15. The lip actuation assembly 700 includes a link 706. The first end of the link 706 is coupled to the lip actuation bracket 602 (described above) that is coupled to the lip 600. The link 706 may be pivotably, rotatably, or otherwise moveably coupled to the lip actuation bracket 602. In some embodiments, a rod 708 extends through holes in both the lip actuation bracket 602 and the link 706.

The second end of the link 706 is coupled to an upper part of a link pivot plate 710. The link pivot plate 710 may be an oblong, triangle-shaped plate that is shaped to connect to and balance the forces of the other parts of the lip actuation assembly 700. The link pivot plate 710 may be pivotably, rotatably, or otherwise moveably coupled to the link pivot plate mount 454 (described above). The link pivot plate mount 454 may hold the link pivot plate 710 in place while allowing it to rotate or pivot.

A spring bracket 712 may be pivotably, rotatably, or otherwise moveably coupled to a lower part of the lip pivot plate 710. The spring bracket 712 is coupled to a spring bar 714 via a bolt-and-nut assembly. The bolt-and-nut connection includes a bolt 716 and a nut 718 threadedly disposed over the threaded shaft of the bolt 716. The threaded shaft of the bolt 716 may be coupled to a first end of the spring bar 714.

The second end of the spring bar 714 may be coupled to a spring 720, which is coupled to the chain 704 shackled to a support plate 246 of the leg bracket assembly 200. The spring 720 may pull backwards on the lower part of the link pivot plate 710 via the spring bar 714, the bolt-and-nut connection, and the spring bracket 712. In some embodiments, the tension of the spring 710 may be adjusted by tightening or loosening the nut 718 on the threaded shaft of the bolt 716.

A dampener 722 is coupled to the upper part of the link pivot plate 710. The dampener 722 may push forwards on the link pivot plate 710. Thus, the dampener 722 and the spring 720 may work to rotate the link pivot plate 710 in the same direction. When rotated in this direction, the link pivot plate 710 pushes forwards on the link 706, which in turn pushes forward on the lip actuation bracket 602. Thus, the lip actuation assembly 700 works to push the lip 600 forward and upward via the lip actuation bracket 602.

Although only one example of a lip actuation assembly 700 is illustrated, any suitable lip actuation assembly may be used.

In view of all the teachings herein, the present disclosure contemplates a variety of different aspects including but not limited to the following:

Some implementations of the present disclosure include a dock leveler for a loading dock. The dock leveler may include a bridge assembly including a deck and a lip extendable from the deck, where the lip is pivotably movable between a stowed position and an extended position. The dock leveler may also include a frame supporting the bridge assembly. The dock leveler may also include a beam and a lip keeper. The beam may include a first end positioned proximate a front edge of the dock. The lip keeper assembly may be configured to selectively secure the lip in the stow position. The lip keeper assembly may be adjustably coupled to the beam permitting adjustment relative to the beam toward or away from the front edge of the dock.

In some embodiments, the lip keeper may include an adjustment bracket that includes a first hole or slot, a lip holder, and a lock system. The lip holder may be configured to receive an edge of a lip and may be coupled to the adjustment bracket. The lock system may be associated with the first hole or slot and may selectively secure the lip holder and allow adjustment of the lip holder. In some embodiments, the lock system may include a first bolt extending through the first slot in the adjustment bracket and a first nut threadedly coupled to the first bolt. In a loosened position, the adjustment bracket may be moveable relative to a beam of the dock leveler and, in a tightened position, the adjustment bracket may not be moveable relative to the beam. In some embodiments, in the tightened position, the first nut may be tightened on the first bolt such that the adjustment bracket is secured between a head of the first bolt and the first nut and, in the loosened position, the first bolt may be slidable along the first hole or slot of the adjustment bracket. In some embodiments, the adjustment bracket may include an L-shaped bracket having a horizontal plate and a vertical plate and an adjustment plate coupled to at least one of the horizontal plate or the vertical plate. In some embodiments, the lip holder may be coupled to the vertical plate of the L-shaped bracket. In some embodiments, the adjustment bracket may also include a second hole or slot. The lip keeper may also include a second bolt extending through the second slot in the adjustment bracket and a second nut threadedly coupled to the second bolt.

Some implementations of the present disclosure may include a dock leveler for a loading dock. The dock leveler may include a bridge assembly comprising a deck and a lip extending from and pivotally connected to the deck. The dock leveler may also include a frame supporting the bridge assembly. The frame may include a first beam and a first lip keeper assembly. The first beam may include a first end positioned proximate a front edge of the dock and a first hole or slot extending through the first end. The first lip keeper assembly may be coupled to the first end of the first beam and may include a first adjustment bracket including a second hole or slot, a first lip holder configured to receive an edge of a lip and coupled to the first adjustment bracket, and a lock system selectively adjustable between an adjustable position and a fixed position. In the adjustable position, the first adjustment bracket may be moveable relative to the first beam and, in a fixed position, the first adjustment bracket may not be moveable relative to the first beam.

In some embodiments, the first lip holder may include a notch sized and shaped for receiving the edge of the lip. In some embodiments, in the fixed position, the first nut may be tightened on the first bolt such that the adjustment bracket is secured between a head of the first bolt and the first nut. In some embodiments, in the adjustable position, the first adjustment bracket may be slidable about the first bolt. In some embodiments, the first adjustment bracket may also include an L-shaped bracket comprising a horizontal plate and a vertical plate and an adjustment plate coupled to at least one of the horizontal plate or the vertical plate. In some embodiments, the first lip holder may be coupled to the vertical plate of the L-shaped bracket. In some embodiments, the leg bracket assembly may be disposed adjacent a back wall of the dock. A second end of the first beam may be coupled to the leg bracket assembly.

In some embodiments, the dock leveler may include a second beam having a third end positioned proximate the front edge of the dock and a fourth end coupled to the leg bracket assembly, with a third hole or slot extending through the third end. A second lip keeper assembly may be coupled to the third end of the second beam. The second lip keeper assembly may also include a second adjustment bracket comprising a fourth hole or slot and a second lip holder configured to receive the edge of the lip, where the second lip holder is coupled to the second adjustment bracket. There may be a second bolt extending through the fourth hole or slot in the second adjustment bracket and a second nut threadedly coupled to the second bolt. In a loosened position, the second adjustment bracket may be moveable relative to the second beam and, in a tightened position, the second adjustment bracket may not be moveable relative to the second beam. In some embodiments, the second beam and second lip keeper may be laterally displaced from the first beam and first lip keeper.

Some implementations of the present disclosure may include dock leveler sized to fit in a loading dock. The dock leveler may include a beam and a lip keeper assembly. The beam may include a first end positioned proximate a front edge of the dock and a first hole or slot extending through the first end. The lip keeper assembly may be coupled to the first end of the beam. The lip keeper assembly may include an adjustment bracket comprising a second hole or slot and a lip holder configured to receive an edge of lip, where the lip holder is coupled to the adjustment bracket. The lip keeper assembly may further include a bolt extending through the second hole or slot in the adjustment bracket and a nut threadedly coupled to the bolt. The adjustment bracket may be slidable about the bolt relative to the beam.

In some embodiments, the nut may be moveable on the bolt to tighten the adjustment bracket onto the beam. In some embodiments, the lip holder may include a notch sized and shaped for receiving the edge of the lip. In some embodiments, the dock leveler may also include a leg bracket assembly disposed proximate to a back wall of the dock, where a second end of the beam may be coupled to the leg bracket assembly.

Some implementations of the present disclosure may include a dock leveler having an adjustable leg bracket assembly. The dock leveler may include an adjustment bracket and a threaded adjustment shaft. The adjustment bracket may include a horizontal plate having a threaded hole. The threaded adjustment shaft may extend through the threaded hole of the horizontal plate and may be configured to adjust a height of the leg bracket assembly by rotation of the adjustment shaft relative to the horizontal plate. The threaded adjustment shaft may have a leading end that abuts against a base plate disposable in a fixed position on a floor of the dock. The base plate may be independent from the adjustment shaft.

In some embodiments, the threaded hole may be a nut integrated with the horizontal plate by welding to a bottom of the horizontal plate. In some embodiments, the adjustment bracket may extend over half of a width of the dock leveler and may have a plurality of threaded holes that accommodate a plurality of threaded adjustment shafts. In some embodiments, the base plate may extend along the dock floor for contact with the plurality of threaded adjustment shafts. In some embodiments, the adjustment bracket may also include a vertical plate coupled to a back edge of the horizontal plate. In some embodiments, the vertical plate may extend downward from the horizontal plate. In some embodiments, the threaded adjustment shaft may be devoid of a foot that distributes weight to the base plate. In some embodiments, the deck may have a hole formed where the hole in the deck is disposed above the threaded adjustment shaft for access through the deck. The deck may be pivotable between a first position and a second position.

Some implementations of the present disclosure may include a dock leveler for a loading dock. The dock leveler may include a leg bracket assembly couplable to a back wall of the dock. The leg bracket assembly may include a leg, an adjustment bracket coupled to a bottom portion of the leg and including a horizontal plate including a hole, a bolt including a threaded shaft extending through the hole in the horizontal plate, and a nut threadedly engaging the threaded shaft of the bolt. The nut may be disposed below the horizontal plate, where the horizontal plate contacts a top of the nut.

In some embodiments, the dock leveler may include a base plate disposed below the bolt. In some embodiments, the leg bracket assembly may also include a deck hinge bracket coupled to a top portion of the leg and a deck hinge shaft coupled to the deck hinge bracket. In some embodiments, a deck may be rotatably coupled to the deck hinge shaft. In some embodiments, the bolt may be devoid of a foot. In some embodiments, the dock leveler may include a deck having a hole formed therein. The deck may be pivotable between a first position and a second position. The hole in the deck may be disposed above the threaded adjustment shaft for access through the deck.

Some implementations of the present disclosure may include a dock leveler. The dock leveler may include an adjustment bracket, a bolt including a threaded shaft extending downward through a hole in the adjustment bracket, a nut threadedly engaging the threaded shaft of the bolt, and a base plate disposed below the adjustment bracket. The bottom end of the bolt may contact the base plate.

In some embodiments, the bottom end of the bolt may not comprise a foot. In some embodiments, the threaded shaft of the bolt includes a shaft diameter, where the shaft diameter may be constant such that the bottom end comprises the same diameter as the shaft diameter. In some embodiments, the nut may be coupled to the adjustment bracket. In some embodiments, the dock leveler may also include a leg coupled to the adjustment bracket. In some embodiments, the dock leveler may include a plurality of bolts and a plurality of nuts.

Some implementations of the present disclosure may include a dock leveler. The dock leveler may include a plurality of legs, a horizontally extending bracket coupled to a bottom region of each leg of the plurality of legs, and a pivot boss coupled to the bracket. The pivot boss may include a first mounting plate, a second mounting plate, and a pivot rod. The first mounting plate may be coupled to the bracket and may include a first hole. The second mounting plate may be laterally spaced from the first mounting plate and may be coupled to the bracket. The second mounting plate may include a second hole. The pivot rod may be disposed within the first hole and the second hole and extending through the space between the first mounting plate and the second mounting plate.

In some embodiments, the bracket may include a top plate. In some embodiments, the first mounting plate may include a first horizontal portion and a first vertical portion and the second mounting plate may include a second horizontal portion and a second vertical portion. The first horizontal portion of the first mounting plate and the second horizontal portion of the second mounting plate may be coupled to the top plate of the adjustment bracket. In some embodiments, the first hole of the first mounting plate may be located at an intersection of the first horizontal portion and the first vertical portion and the second hole of the second mounting plate may be located at an intersection of the second horizontal portion and the second vertical portion. In some embodiments, the pivot rod of the pivot boss may be disposed proximate to bracket of the leg bracket assembly. In some embodiments, the bracket may include a bolt disposed through a bolt hole in the top plate of the adjustment bracket and a nut threadedly engaging the bolt below the top plate. In some embodiments, at least one of a height or a level of the adjustment bracket may be adjustable by adjusting a position of the nut on the bolt. In some embodiments, at least one of a height or a level of the pivot boss may be adjustable by adjusting a position of the nut on the bolt. In some embodiments, the pivot boss may be disposed between a first leg and a second leg of the plurality of legs.

Some implementations of the present disclosure may include a dock leveler for a loading dock. The dock leveler may include a plurality of legs, a horizontally extending lower bracket coupled to a bottom region of each leg of the plurality of legs, a horizontally extending upper bracket coupled to an upper region of each leg of the plurality of legs, and a pivot boss coupled to the lower bracket. The pivot boss may include a first mounting plate coupled to the adjustment bracket and a first hole and a pivot rod for pivotable attachment to a lift assembly.

In some embodiments, the lower bracket may include a top plate. In some embodiments, the dock leveler may include a second mounting plate adjacent the first mounting plate. The first mounting plate may include a first horizontal portion and a first vertical portion and the second mounting plate may include a second horizontal portion and a second vertical portion. The first horizontal portion of the first mounting plate and the second horizontal portion of the second mounting plate may be coupled to the adjustment bracket. In some embodiments, the first hole of the first mounting plate may be located at an intersection of the first horizontal portion and the first vertical portion and the second hole of the second mounting plate may be located at an intersection of the second horizontal portion and the second vertical portion. In some embodiments, the pivot rod of the pivot boss may be disposed proximate to the adjustment bracket of the leg bracket assembly. In some embodiments, the first mounting plate and the second mounting plate may be configured to contact the back wall of the dock.

Some implementations of the present disclosure may include a dock leveler sized for a loading dock. The dock leveler may include a leg bracket assembly couplable to a back wall of the dock. The leg bracket assembly may include a plurality of legs, a deck hinge bracket coupled to a top portion of each leg of the plurality of legs, a deck hinge shaft coupled to the deck hinge bracket, an adjustment bracket coupled to a bottom portion of each leg of the plurality of legs, and a pivot boss coupled to the adjustment bracket. The pivot boss may include a first mounting plate coupled to the adjustment bracket and including a first hole and a rod disposed within the first hole of the first mounting plate. The dock leveler may also include a deck rotatably coupled to the deck hinge shaft of the leg bracket assembly and a lift assembly rotatably coupled to the pivot boss and rotatably coupled to a bottom of the deck.

In some embodiments, the lift assembly may include a lower arm having a first end and a second end and an upper arm having a third end and a fourth end. The first end of the lower arm may be rotatably coupled to the rod of the pivot boss, the third end of the upper arm may be rotatably coupled to the deck, and the second end of the lower arm and the fourth end of the upper arm may be rotatably coupled. In some embodiments, the adjustment bracket may include a bolt disposed through a bolt hole in the top plate of the adjustment bracket and a nut threadedly engaging the bolt below the top plate. In some embodiments, at least one of a height or a level of the adjustment bracket is adjustable by adjusting a position of the nut on the bolt. In some embodiments, at least one of a height or a level of the pivot boss is adjustable by adjusting a position of the nut on the bolt.

Some implementations of the present disclosure may include a leg bracket assembly for use in a dock leveler. The dock leveler may include a leg, a deck hinge bracket coupled to a top portion of the leg, a first stock plate coupled to the deck hinge bracket, and a deck hinge shaft contacting the first stock plate. The first stock plate may extend upward from the deck hinge bracket and may extend along at least a portion of the length of the deck hinge bracket.

In some embodiments, the dock leveler may include a plurality of stock plates that includes the first stock plate, where each stock plate of the plurality of stock plates extends along at least a portion of the length of the deck hinge bracket. In some embodiments, each of the plurality of stock plates may be colinear. In some embodiments, the plurality of stock plates may extend along a majority of the length of the deck hinge bracket. In some embodiments, the plurality of stock plates may extend along a majority of a length of the deck hinge shaft. In some embodiments, each of the plurality of stock plates may be spaced from a neighboring stock plate. In some embodiments, the dock leveler may include one or more C-shaped brackets coupled to the deck hinge bracket, where the one or more C-shaped brackets are shaped to receive the deck hinge shaft.

Some implementations of the present disclosure may include a dock leveler. The dock leveler may include a leg, a deck hinge bracket coupled to a top portion of the leg and comprising a bottom plate, a first C-shaped bracket coupled to a top surface of the bottom plate, a first stock plate coupled to the top surface of the bottom plate, and a deck hinge shaft disposed within the first C-shaped bracket and contacting a top of the first stock plate. The first stock plate may extend from a location proximate the first C-shaped bracket along a first portion of a length of the bottom plate.

In some embodiments, a second C-shaped bracket may be coupled to the top surface of the bottom plate of the deck hinge bracket and may be spaced from the first C-shaped bracket. The deck hinge shaft is disposed within the second C-shaped bracket. In some embodiments, the first stock plate may be located between the first C-shaped bracket and the second C-shaped bracket such that the first stock plate provides continuous support to the deck hinge shaft between the first C-shaped bracket and the second C-shaped bracket. In some embodiments, the deck hinge shaft may extend from a first location proximate a first end of the deck hinge bracket to a second location proximate a second end of the deck hinge bracket. In some embodiments, the first C-shaped bracket may be coupled to the deck hinge bracket at a third location proximate the first end of the deck hinge bracket. In some embodiments, a second stock plate may be coupled to the top surface of the bottom plate of the deck hinge bracket and may extend along a second portion of the length of the bottom plate. In some embodiments, the second stock plate may be spaced from the first stock plate. In some embodiments, the second stock plate and the first stock plate may be colinear.

Some implementations of the present disclosure may include a dock leveler for a loading dock. The dock leveler may include a leg bracket assembly couplable to a back wall of the dock and a deck. The leg bracket assembly may include a leg, a deck hinge bracket coupled to a top portion of the leg, a stock plate coupled to the deck hinge bracket and extending upward therefrom, and a deck hinge shaft contacting the stock plate. The stock plate may extend along at least a portion of the length of the deck hinge bracket. The back of the deck may be rotatably coupled to the deck hinge shaft.

In some embodiments, the back of the deck may include a first end and a second end and the deck hinge shaft may extend from the first end to the second end. In some embodiments, the leg bracket assembly may also include a plurality of stock plates including the first stock plate. Each stock plate of the plurality of stock plates may extend along at least a portion of the length of the deck hinge bracket. In some embodiments, each stock plate of the plurality of stock plates extends may contact the deck hinge shaft such that the deck hinge shaft is continuously supported by the plurality of stock plates. In some embodiments, the plurality of stock plates may extend along a majority of the length of the deck hinge bracket.

Some implementations of the present disclosure may include a dock leveler. The dock leveler may include a leg and a deck hinge bracket coupled to a top portion of the leg. The deck hinge bracket may include a rear plate couplable to a back wall of the dock, a bottom plate coupled to the rear plate, and a deck hinge shaft coupled to the bottom plate of the deck hinge bracket. In some embodiments, the bottom plate of the deck hinge bracket may include a stock plate extending upward from a top surface of the bottom plate. The deck hinge shaft may be coupled to a top surface of the stock plate. In some embodiments, the deck hinge bracket may also include a C-shaped bracket coupled to the rear plate and the bottom plate, where the deck hinge shaft is disposed within the C-shaped bracket. In some embodiments, the deck hinge shaft is coupled to the C-shaped bracket. In some embodiments, the rear plate of the deck hinge bracket may include a weld point. In some embodiments, an adjustment bracket may be coupled to a bottom portion of the leg. In some embodiments, a support plate may be coupled to the leg at least partially between the adjustment bracket and the deck hinge bracket.

Some embodiments of the present disclosure may include, a dock leveler for a loading dock. The dock leveler may include a leg bracket assembly. The leg bracket assembly may include a leg and a deck hinge bracket coupled to a top portion of the leg. The deck hinge bracket may include a rear plate couplable to a back wall of the dock, a bottom plate coupled to the rear plate, and a deck hinge shaft coupled to the bottom plate of the deck hinge bracket. The dock leveler may also include a deck rotatably coupled to the deck hinge shaft.

In some embodiments, the bottom plate of the deck hinge bracket may include a stock plate extending upward from a top surface of the bottom plate. The deck hinge shaft may contact a top surface of the stock plate. In some embodiments, the deck hinge bracket may also include a C-shaped bracket coupled to the rear plate and the bottom plate, where the deck hinge shaft is disposed within the C-shaped bracket. In some embodiments, the deck hinge shaft is coupled to the C-shaped bracket. In some embodiments, the rear plate of the deck hinge bracket may include a weld point. In some embodiments, the back wall of the dock may include a curb angle. The rear plate of the deck hinge bracket may be coupled to the curb angle.

Some implementations of the present disclosure may include a dock leveler for a loading dock. The dock leveler may have a leg bracket assembly. The leg bracket assembly may include a leg, a deck hinge bracket coupled to a top portion of the leg and a back wall of the dock, and a deck hinge shaft coupled to the deck hinge bracket such that the deck hinge shaft is proximate the back wall of the dock. The dock leveler may also include a deck rotatably coupled to the deck hinge shaft such that a back end of the deck is proximate a top edge of the back wall of the dock.

In some embodiments, the deck hinge bracket may include a rear plate and a bottom plate coupled to the rear plate. The deck hinge shaft may be coupled to the bottom plate. In some embodiments, the bottom plate of the deck hinge bracket may include a stock plate extending upward from a top surface of the bottom plate. The deck hinge shaft may be coupled to a top surface of the stock plate. In some embodiments, the deck hinge bracket may also include a C-shaped bracket coupled to the rear plate and the bottom plate, where the deck hinge shaft is disposed within the C-shaped bracket. In some embodiments, the deck hinge shaft is coupled to the C-shaped bracket. In some embodiments, the rear plate of the deck hinge bracket may include a weld point. In some embodiments, the back wall of the dock may include a curb angle. The rear plate of the deck hinge bracket may be coupled to the curb angle.

Some implementations of the present disclosure may include a dock leveler. The dock leveler may include a deck platform having a back end and a front end and a first beam extending from the back end of the deck platform to the front end. The first beam may include a first top horizontal plate, a first bottom horizontal plate, and a first vertical plate connecting the first top horizontal plate and the first bottom horizontal plate. The first top horizontal plate may be coupled to a bottom surface of the deck platform.

In some embodiments, the top of the first vertical plate may be coupled to a first side of the first top horizontal plate and the bottom of the first vertical plate may be coupled to a second side of the first bottom horizontal plate. In some embodiments, the first bottom horizontal plate may be aligned with the first top horizontal plate.

In some embodiments, the dock leveler may also include a second beam extending from the back end of the deck platform to the front end. The second beam may include a second top horizontal plate, a second bottom horizontal plate, and a second vertical plate connecting the second top horizontal plate and the second bottom horizontal plate. The second top horizontal plate may be coupled to a bottom surface of the deck platform. In some embodiments, the second beam may be spaced from the first beam.

Some implementations of the present disclosure may include a dock leveler. The dock leveler may include a deck platform comprising a back end and a front end and a beam coupled to a bottom surface of the deck platform. The beam may include a first end coupled to the bottom surface of the deck platform proximate to the back end and a second end coupled to the bottom surface of the deck platform proximate to the front end. The first end may include an extension including a cutout shaped to fit around a deck hinge shaft; and In some embodiments, the dock leveler may include a hinge bracket coupled to the back end of the deck platform. In some embodiments, the hinge bracket may include a top plate and a back plate. In some embodiments, the extension of the beam may be disposed below the top plate of the hinge bracket. In some embodiments, the extension may also include a concave portion. In some embodiments, the cutout may be V-shaped. In some embodiments, the cutout may be concave. In some embodiments, the base of the extension may include a notch.

Some implementations of the present disclosure may include a dock leveler sized to fit in a dock loading dock. The dock leveler may include a leg bracket assembly couplable to a back wall of the dock and a deck. The leg bracket assembly may include a deck hinge shaft. The deck may include a deck platform having a back end and a front end and a beam coupled to a bottom surface of the deck platform. The deck may include a C-shaped profile, a first end coupled to the bottom surface of the deck platform proximate to the back end, and a second end coupled to the bottom surface of the deck platform proximate to the front end. The first end of the beam may include an extension having a cutout shaped to fit around the deck hinge shaft.

In some embodiments, the C-shaped profile of the beam may include a top horizontal plate, a bottom horizontal plate, and a vertical plate connecting the top horizontal plate and the bottom horizontal plate. The top horizontal plate may be coupled to the bottom surface of the deck platform. In some embodiments, the deck may also include a hinge bracket coupled to the back end of the deck platform. In some embodiments, the hinge bracket may include a top plate and a back plate. In some embodiments, the extension of the beam may be disposed below the top plate of the hinge bracket. In some embodiments, the extension and the hinge bracket may rotatably couple the deck to the deck hinge shaft. In some embodiments, the extension may also include a concave portion shaped to accommodate the leg bracket assembly.

Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A dock leveler, comprising:
a leg;
a deck hinge bracket coupled to a top portion of the leg, wherein the deck hinge bracket comprises:
a rear plate couplable to a back wall of a dock;
a bottom plate coupled to the rear plate; and
a deck hinge shaft coupled to the bottom plate of the deck hinge bracket; and
wherein the bottom plate of the deck hinge bracket comprises a protrusion, the protrusion being positioned directly below the deck hinge shaft and extending upwardly from the deck hinge bracket toward the deck hinge shaft.

2. The dock leveler of claim 1, wherein the protrusion extends upwardly from a top surface of the bottom plate, and wherein the deck hinge shaft is coupled to a top surface of the protrusion.

3. The dock leveler of claim 1, wherein the deck hinge bracket further comprises a C-shaped bracket coupled to the rear plate and the bottom plate, wherein the deck hinge shaft is disposed within the C-shaped bracket.

4. The dock leveler of claim 3, wherein the deck hinge shaft is coupled to the C-shaped bracket.

5. The dock leveler of claim 1, wherein the rear plate of the deck hinge bracket comprises a weld point.

6. The dock leveler of claim 1, wherein an adjustment bracket is coupled to a bottom portion of the leg.

7. The dock leveler of claim 6, wherein a support plate is coupled to the leg at least partially between the adjustment bracket and the deck hinge bracket.

8. A dock leveler for a loading dock, comprising:
a leg bracket assembly, comprising:
a leg;
a deck hinge bracket coupled to a top portion of the leg, wherein the deck hinge bracket comprises:
a rear plate couplable to a back wall of the loading dock;
a bottom plate coupled to the rear plate;
a deck hinge shaft coupled to the bottom plate of the deck hinge bracket; and
a deck rotatably coupled to the deck hinge shaft; and
wherein the bottom plate of the deck hinge bracket comprises a protrusion, the protrusion being positioned directly below the deck hinge shaft and extending upwardly from the deck hinge bracket toward the deck hinge shaft.

9. The dock leveler of claim 8, wherein the protrusion extends upwardly from a top surface of the bottom plate, and wherein the deck hinge shaft contacts a top surface of the protrusion.

10. The dock leveler of claim 8, wherein the deck hinge bracket further comprises a C-shaped bracket coupled to the rear plate and the bottom plate, wherein the deck hinge shaft is disposed within the C-shaped bracket.

11. The dock leveler of claim 10, wherein the deck hinge shaft is coupled to the C-shaped bracket.

12. The dock leveler of claim 8, wherein the rear plate of the deck hinge bracket comprises a weld point.

13. The dock leveler of claim 8, wherein the back wall of the loading dock comprises a curb angle, and wherein the rear plate of the deck hinge bracket is coupled to the curb angle.

14. A dock leveler for a loading dock, comprising:
a leg bracket assembly, comprising:
a leg;
a deck hinge bracket coupled to a top portion of the leg and a back wall of the loading dock;
a deck hinge shaft coupled to the deck hinge bracket such that the deck hinge shaft is proximate the back wall of the loading dock; and
a deck rotatably coupled to the deck hinge shaft such that a back end of the deck is proximate a top edge of the back wall of the loading dock; and
wherein a bottom plate of the deck hinge bracket comprises a protrusion, the protrusion being positioned directly below the deck hinge shaft and extending upwardly from the deck hinge bracket toward the deck hinge shaft.

15. The dock leveler of claim 14, wherein the deck hinge bracket comprises a rear plate and a bottom plate coupled to the rear plate, and wherein the deck hinge shaft is coupled to the bottom plate.

16. The dock leveler of claim 15, wherein the protrusion extends upwardly from a top surface of the bottom plate, and wherein the deck hinge shaft contacts a top surface of the protrusion.

17. The dock leveler of claim 14, wherein the deck hinge bracket further comprises a C-shaped bracket coupled to the deck hinge bracket, wherein the deck hinge shaft is disposed within the C-shaped bracket.

18. The dock leveler of claim 17, wherein the deck hinge shaft is coupled to the C-shaped bracket.

19. The dock leveler of claim 14, wherein the deck hinge bracket comprises a weld point.

20. The dock leveler of claim 14, wherein the back wall of the loading dock comprises a curb angle, and wherein a rear plate of the deck hinge bracket is coupled to the curb angle.

* * * * *